(12) United States Patent
Nakagawa et al.

(10) Patent No.: US 8,011,491 B2
(45) Date of Patent: Sep. 6, 2011

(54) CONVEYANCE APPARATUS FOR AN ASSEMBLY LINE

(75) Inventors: Susumu Nakagawa, Osaka (JP);
Nobuyuki Tanaka, Osaka (JP);
Shigeyoshi Nishihara, Shiga (JP)

(73) Assignee: Daifuku Co., Ltd. (JP)

( * ) Notice: Subject to any disclaimer, the term of this patent is extended or adjusted under 35 U.S.C. 154(b) by 219 days.

(21) Appl. No.: 12/398,301

(22) Filed: Mar. 5, 2009

(65) Prior Publication Data
US 2009/0250315 A1 Oct. 8, 2009

(30) Foreign Application Priority Data

Apr. 3, 2008 (JP) ................................. 2008-096724

(51) Int. Cl.
*B65G 37/00* (2006.01)

(52) U.S. Cl. .................. 198/346.2; 198/468.6
(58) Field of Classification Search ............... 198/343.1, 198/343.2, 346, 346.3, 468.6
See application file for complete search history.

(56) References Cited

U.S. PATENT DOCUMENTS

| 4,646,915 | A | * | 3/1987 | Ohtaki et al. | 198/346.2 |
| 5,027,502 | A | * | 7/1991 | Sakamoto et al. | 29/783 |
| 6,155,402 | A | * | 12/2000 | Murphy | 198/346.2 |
| 7,731,013 | B2 | * | 6/2010 | Milner et al. | 198/468.6 |
| 2005/0194234 | A1 | * | 9/2005 | Schmohl et al. | 198/346.2 |
| 2006/0032728 | A1 | * | 2/2006 | Smith et al. | 198/468.6 |

FOREIGN PATENT DOCUMENTS

| JP | S50-133579 | | 10/1975 | |
| JP | 61295183 | A | 12/1986 | |
| JP | 62171521 | A | 10/1987 | |
| JP | 3-238224 | * | 10/1991 | 198/468.6 |
| JP | H06-059731 | | 3/1994 | |
| JP | 2002035046 | A | 2/2002 | |
| JP | 2003246263 | A | 9/2003 | |

* cited by examiner

*Primary Examiner* — James R Bidwell
(74) *Attorney, Agent, or Firm* — St. Onge Steward Johnston & Reens LLC

(57) ABSTRACT

A conveyance apparatus has a conveyance carriage for conveying a vehicle body, a vehicle-body support, a synchronous traveling carriage capable of traveling in synchronization with the conveyance carriage from a start point position to an end point position, a lifter provided with an elevating base that ascends via an aperture arranged on a floor surface of the conveyance carriage, and an elevating table for supporting an engine of an engine carrying-in carriage that stops at a fixed stop position and is lifted up to a predetermined height by the elevating base of the lifter.

8 Claims, 12 Drawing Sheets

CONVEYANCE APPARATUS FOR AN ASSEMBLY LINE

The present invention relates to a conveyance apparatus for assembling an article such as an automobile, etc., provided with a section in which a part assembly work for assembling assembly parts such as an engine to a vehicle body from below the vehicle body is performed.

RELATED ART

On an assembly line of automobiles, a step of assembling an engine to a vehicle body is incorporated. At this step of assembling an engine to a vehicle body, the vehicle body is conveyed at a predetermined height above a work floor surface, and from below the vehicle body, the engine is assembled. In the general method of this engine assembly work, as described in Japanese Published Unexamined Patent Application No. H06-59731, a vehicle body is supported by an overhead-type carrier such as a trolley conveyor hanger, the vehicle body is conveyed in a suspended state, and an engine conveyance carriage is traveled synchronously below the suspended conveyance line for this vehicle body. This is followed by: the loaded engine is lifted up by a lifter provided in the engine conveyance carriage, the engine is fitted from below within the vehicle body, and a worker who enters below the vehicle body couples the engine to the vehicle body.

In the method described in the Patent Document 1, the vehicle body is suspended and conveyed by the overhead-type carrier. Therefore, a structural member for safely supporting a carrier traveling guide rail becomes necessary in the air. This creates problems that not only is material cost high, but also the number of steps required for an installation work is large, and a relatively long period of construction is required. On the other hand, as described in Patent Document 2 (Japanese Published Unexamined Patent Application No. S50-133579), there is also known a conveyance apparatus for assembling an automobile in which an assembly work is preformed as follows: a vehicle body is supported at a predetermined height on a conveyance carriage that travels on a floor surface, an engine is carried in on the floor surface of the conveyance carriage below the vehicle body, and the engine is lifted up by a lifter provided in the conveyance carriage so as to be fitted from below within the vehicle body. With this conveyance apparatus using a conveyance carriage, the various problems occurring when the above-described conveyance apparatus using an overhead-type carrier is adopted can be solved. However, the following defects are present.

That is, in the conveyance apparatus using a conveyance carriage as described in Patent Document 2, there is a need for providing lifters for lifting up the engine for all the conveyance carriages loaded thereon with the vehicle body one by one, and thus, as seen from a whole facility, the cost is very expensive. It is obvious, as in the engine conveyance carriage described in Patent Document 1, that it may be possible to configure such that the engine conveyance carriage provided with a lifter for lifting up the loaded engine is combined, the engine conveyance carriage is ridden on the conveyance carriage for conveying a vehicle body, the loaded engine is lifted up by the lifter on the engine conveyance carriage so as to be fitted from below within the vehicle body. According to this method, the lifter is not needed for the conveyance carriage for conveying a vehicle body. However, on the other hand, for all the engine conveyance carriage for loading an engine one by one, lifters for lifting up an engine are needed. Therefore, as seen from a whole facility, the problem of high cost still remains the same.

DETAILED DESCRIPTION OF THE INVENTION

An object of the present invention is to provide a conveyance apparatus for assembling an automobile, etc., which can solve the above-described conventional problems. Described with reference numerals of an embodiment described later, a conveyance apparatus for assembling an automobile, etc., as described in a first aspect includes: support means 12 being arranged, for supporting an object (vehicle body B) on a conveyance carriage 1 for conveying the object such as the vehicle body B at a predetermined height above the conveyance carriage 1; the support means 12 being configured by a column 14 installed upright on the conveyance carriage 1 outside the object (vehicle body B) and object support devices 16a and 16b attached to the column 14; and the conveyance apparatus being configured such that a part assembly work can be performed from below on the object (vehicle body B) on the conveyance carriage 1, the conveyance apparatus, below a specific section (engine-assembly-work section 6) where the part assembly work is performed within a traveling route 2 of the conveyance carriage 1, a synchronous traveling carriage 22 capable of traveling in synchronization with the conveyance carriage 1 from a start point position 6a to an end point position 6b in the specific section is arranged, on the synchronous traveling carriage 22, a lifter 31 provided with an elevating base 55 that elevates via an aperture 71 arranged on a floor surface 1a of the conveyance carriage 1 is loaded, and an assembly-part support base (table ceiling plate 78) carried in on the carriage floor surface 1a is lifted up to a predetermined height by the elevating base 55 of the lifter 31.

The conveyance apparatus for assembling an automobile, etc., according to the present invention as described in a first aspect is configured so that the object such as a vehicle body is conveyed in a manner to be supported at a predetermined height by the support means arranged on the conveyance carriage. Thus, unlike the case where the conventional overhead-type carrier is utilized, there is no need for installing a carrier-support-guiding guide rail in a hanging manner at a predetermined height in the air, and therefore, the carrier, i.e., the support-guiding guide rail of the conveyance carriage, may be laid on the floor surface of a building. Therefore, it is possible to construct a transportation route for an object such as a vehicle body simply and inexpensively, and the number of steps for that construction and the construction period can be significantly reduced. In particular, according to the configuration of the present invention, the following effects can be expected.

That is, as long as a support base (including a palette and a hand truck) carried thereon with an assembly part such as an engine is carried in at a predetermined position on a conveyance carriage when the conveyance carriage reaches a start point position in a specific section where a part-assembly work is performed or before that time, by actuating a lifter provided in a synchronous traveling carriage that travels in synchronization with the conveyance carriage from the start point position to the end point position in the specific section, the assembly-part support base on the conveyance carriage can be lifted up so that the assembly part can be fitted from below into the predetermined position within the object. Therefore, the assembly part may be coupled to the object by manual labor or an automatic machine before the lifter is descended after the conveyance carriage reaches the end point position in the specific section.

Then, when the conveyance carriage reaches the end point position in the specific section, the lifter, together with the assembly-part support base, is descended downwardly of the conveyance carriage, and the empty assembly-part support base that is returned onto the conveyance carriage is removed or exited from on the conveyance carriage and the lifter can be returned onto the synchronous traveling carriage. As a result, the conveyance carriage can be traveled so as to convey the object while utilizing an area on the carriage floor surface below the object supported on the conveyance carriage as a work floor, and on the other hand, the synchronous traveling carriage that is bordered off from the conveyance carriage after the lifter is descended can be made to prepare for the next work after being returned back to the start point position in the specific section.

That is, according to the conveyance apparatus for assembling an automobile, etc., according to the present invention described in the first aspect, there is no need for arranging the lifter of the assembly-part support base on the conveyance carriage for conveying an object in a manner to be supported at a predetermined height. This allows simplification of the configuration of the conveyance carriage that is needed in a large number on the assembly line, and as a result, as compared to the conventional configuration where the lifter is installed for each conveyance carriage, a significant facility cost reduction can be implemented. Furthermore, as compared to the case where a carriage is utilized as means for carrying in an assembly-part support base at a predetermined position on the conveyance carriage and as compared to the case where a lifter for lifting up the assembly-part support base is arranged for each carriage, the lifter for lifting up the assembly-part support base may just need to be arranged only on the synchronous traveling carriage that travels in synchronization with the conveyance carriage in the specific section that is very short in the middle of the assembly line. Therefore, even if it is configured so that a plurality of synchronous traveling carriages are traveled in circulation, as compared to the number of carriages for individually carrying in the assembly part, the number of synchronous traveling carriages is smaller. By extension, the number of lifters arranged on the synchronous traveling carriage is small, and thus, a significant facility cost reduction can also be implemented.

To carry out the thus configured present invention, more specifically, as described in a second aspect, the synchronous traveling carriage 22 can be supported in a manner capable of traveling back and forth parallel with the traveling route 2 of the conveyance carriage 1, the synchronous traveling carriage 22 can be provided with joining means 29 that can be joined to and detached from a joined portion 32 arranged on the conveyance carriage 1, and reversing drive means 30 for causing the synchronous traveling carriage 22 of which the joining to the conveyance carriage 1 is cancelled at the end point position 6b in the specific section to travel back to the start point position 6a in the specific section can be arranged. In this case, as described in a third aspect, the joined portion 32 can be configured by a columnar protrusion 33 protrudingly provided downwardly at a bottom of the conveyance carriage 1, the joining means 29 can be configured by a pair of front and rear openable, closable gripping pieces 34a and 34b for gripping the columnar protrusion 33 from both front and rear sides in a traveling direction of the conveyance carriage 1, and a pair of actuators (cylinder units 35a and 35b) for separately driving to open and close the gripping pieces 34a and 34b, and in the front-side gripping piece 34a, detecting means (39, 41) for detecting approaching of the columnar protrusion 33 can be appended.

The reversing drive means 30 described in the second aspect may be configured by a drive chain, a cylinder unit, etc., stretched to be installed along the traveling route 4 of the synchronous traveling carriage 22. However, as described in a fourth aspect, the reversing drive means 30 that is configured by: a passive wheel 44 arranged in an axle 43 attached with a pair of left and right wheels 26 of the synchronous traveling carriage 22; a drive wheel 45 pressure-contacting this passive wheel 44, switching means 46 for switching between the drive wheel 45 pressure-contacting the passive wheel 44 and the drive wheel 45 being separated from the passive wheel 44; and a motor 47 for rotation-driving the drive wheel 45 may be adopted. The configuration described in the fourth aspect can also be carried out in combination with the configuration described in the third aspect.

According to the configuration described in the second aspect, one synchronous traveling carriage provided with a lifter may be sufficient, and thus, a further facility cost reduction may be implemented. Moreover, the synchronous traveling carriage and the conveyance carriage are joined by the joining means so as to cause the synchronous traveling carriage to travel synchronously with the conveyance carriage, and the drive means is used only for causing the synchronous traveling carriage to travel back to the start point position in the specific section. As a result, the structure and the control are simple, and thus, the present invention may be carried out inexpensively. Furthermore, according to the configuration described in the third aspect, out of the pair of front and rear openable, closable gripping pieces configuring the joining means, the front-side gripping piece is closed to a gripping posture in advance, and when the detecting means provided in the front-side gripping piece detects approaching of the columnar protrusion (joined portion) on the conveyance carriage side, then, the rear-side gripping piece may be switched to the closed posture. Thus, although the control of the joining means is simple, the synchronous traveling carriage may be traveled synchronously with the conveyance carriage while reliably keeping a fixed positional relationship. Furthermore, when reversing drive means for causing the synchronous traveling carriage to travel back to the start point position in the specific section is configured as described in the fourth aspect, as compared to the case where a drive chain or a cylinder unit for propelling the synchronous traveling carriage in the reversing direction is disposed aside the traveling route of the synchronous traveling carriage, or compared to the case where a clutch mechanism is interposed between the axle and the motor, the present invention can be carried out more inexpensively.

Furthermore, as described in a fifth aspect, it may be configured so that the aperture 71 arranged on the floor surface 1a of the conveyance carriage 1 is annexed with an openable, closable lid plate 72 that is a part of the floor surface 1a of the conveyance carriage 1 when the aperture 71 is closed, and the aperture 71 is opened as a result of the lid plate 72 being lifted up by ascent of the elevating base 55 of the lifter 31. The configuration described in the fifth aspect can be carried out in combination with the configuration described in any one of the first to fourth aspects.

According to the configuration described in the fifth aspect, the aperture, arranged on the floor surface of the conveyance carriage, for elevating in a penetrating manner the elevating base of the lifter on the synchronous traveling carriage side, is usually closed by the lid plate. Thus, as compared to the case where the aperture is left open, a work on the floor surface of the conveyance carriage can be performed more safely. Moreover, the lid plate of the aperture is opened by the ascent of the elevating base of the lifter on the synchronous traveling carriage side, and thus, as compared to the case where the lid plate needs to be opened manually with a precise timing, the burden of a worker is lessened and the safety can be increased as well.

In this case, as described in a sixth aspect, it may be possible to configure such that the lid plate 72 is liftable vertically from the floor surface 1a of the conveyance carriage 1 and an interlocked portion 74 is arranged on a bottom of the lid plate 72, in the elevating base 55 of the lifter 31, an interlocking portion 75 for positioning the lid plate 72 on the elevating base 55 by being interlocked with the interlocked portion 74 of the lid plate 72 is arranged, and the assembly-part support base (table ceiling plate 78) carried in on the carriage floor surface 1a is lifted up by the elevating base 55 of the lifter 31 via the lid plate 72. Furthermore, as described in a seventh aspect, the elevating base 55 of the lifter 31 is supported elevatably within a fixed range relative to an elevating platform 54 at an upper end of the lifter and also is urged and maintained at an ascent point position by a first spring (compression coil springs 64a and 64b), in the elevating platform 54, a lid-plate-detecting elevating rod 65 that is supported elevatably between a protruding position and an exiting, entering position relative to the elevating base 55 at the ascent point position and that is urged and maintained at the protruding position by a second spring (compression coil spring 66) can be arranged. The strengths of the first spring (compression coil springs 64a and 64b) and the second spring (compression coil spring 66) are set so that when the elevating base 55 at the ascent point position lifts up the lid plate 72 only, the lid-plate-detecting elevating rod 65 is only descended while the elevating base 55 is not descended, and sensors 69 and 70 for separately detecting a descent of the elevating base 55 from the elevating platform 54 and a descent of the lid-plate-detecting elevating rod 65 from the elevating base 55 at the ascent point position may be annexed.

According to the configuration described in the sixth aspect, as compared to the case where a lid plate of a single-swinging or two-fold type supported pivotally by a hinge is pushed up and opened by the elevating base of the lifter, the support structure of the lid plate becomes simple and the opening of the lid plate can be smoothly performed, and also the lid plate can be reliably returned to the closed position when the elevating base of the lifter finishes descending from the aperture. Furthermore, in this case, according to the configuration described in the seventh aspect, by means of the two sensors, it is possible to separately and reliably detect a time point when the elevating base of the lifter supports the lid plate of the aperture on the conveyance carriage side and that when the elevating base supports the assembly-pat support base via the lid plate, and it is also possible to easily and adequately perform the elevating control of the lifter.

Furthermore, as described in an eighth aspect, the assembly-part support base (table ceiling plate 78) is supported on an assembly-part carrying-in carriage (engine carrying-in carriage 3) capable of transferring onto the floor surface 1a of the conveyance carriage 1 from outside the traveling route 2 of the conveyance carriage 1 and exiting to outside the traveling route 2 of the conveyance carriage 1 from the floor surface 1a of the conveyance carriage 1, and the elevating base 55 of the lifter 31 is configured to lift up the assembly-part support base (table ceiling plate 78) by ascending in a penetrating manner the assembly-part carrying-in carriage (engine carrying-in carriage 3) that stops at a fixed position on the floor surface 1a of the conveyance carriage 1. In this case, as described in a ninth aspect, the assembly-part support base (table ceiling plate 78) can be attached elevatably on the assembly-part carrying-in carriage (engine carrying-in carriage 3). Furthermore, as described in a tenth aspect, on the floor surface 1a of the conveyance carriage 1, positioning means (81 to 85) for positioning the assembly-part carrying-in carriage (engine carrying-in carriage 3) at a fixed position can be disposed. It is noted that the configuration described in the eighth aspect can be carried out in combination with the configuration described in any one of the first to seventh aspects, and also, the configuration described in the tenth aspect can be carried out in combination with the configuration described in the eighth or ninth aspect.

EFFECTS OF THE INVENTION

According to the configuration described in the eighth aspect, as compared to the case where the assembly-part support base is carried in and mounted at a predetermined position directly on the floor surface of the conveyance carriage by a forklift, etc., a carrying-in work of the assembly-part support base onto the conveyance carriage can be performed easily and simply. In this case, according to the configuration described in the ninth aspect, the assembly-part support base is attached elevatably on the assembly-part carrying-in carriage. Therefore, even when the area of the elevating base on the lifter side is made sufficiently smaller as compared to the area of the assembly-part support base, or even when a position for pushing up the assembly-part support base by the elevating base is slightly deviated, the assembly-part support base can be safely and reliably ascended and moved while reliably keeping a predetermined posture (horizontal posture) relative to the assembly-part carrying-in carriage. In other words, the area of the elevating base on the lifter side can be made smaller, and then, the area of the aperture arranged on the floor surface of the conveyance carriage can be made small, and the high precision is not required for the stop position of the assembly-part carrying-in carriage. Furthermore, according to the configuration described in the tenth aspect, the assembly-part support base on the assembly-part carrying-in carriage can be more safely and reliably pushed up to a predetermined position.

DESCRIPTION OF SYMBOLS

Figure 1:
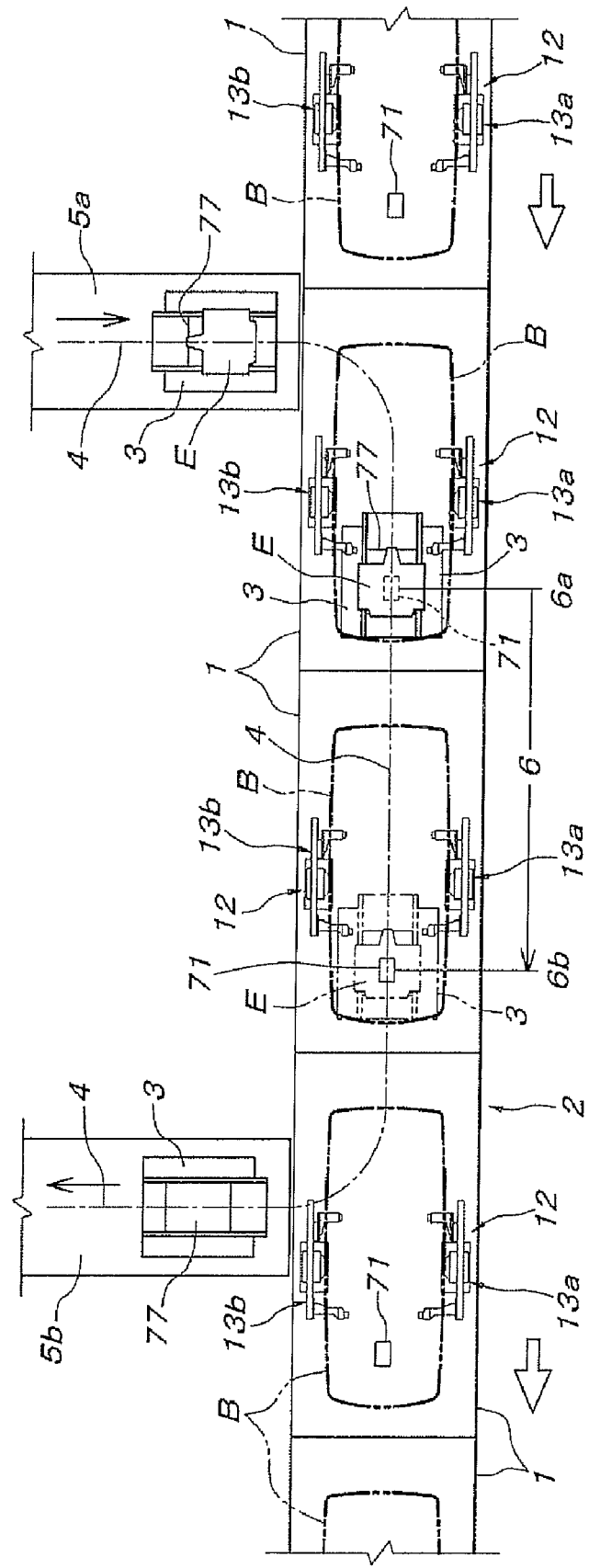
FIG. 1 is a schematic plan view showing an engine-assembly-work section in the middle of an automobile assembly line.

1: Conveyance carriage
1a: Carriage floor surface
2: Traveling route of conveyance carriage
3: Engine carrying-in carriage
4: Traveling route of engine carrying-in carriage
6: Engine assembly work section
7: Guide rail of conveyance carriage
8, 26: Wheel
12: Vehicle-body support means (object support means)
13a, 13b: Vehicle-body support unit
14: Column
15: Horizontal beam
16a, 16b: Vehicle body (object) support device
17: Friction driving means
22: Synchronous traveling carriage
23: Traveling route of synchronous traveling carriage
25: Guide rail of synchronous traveling carriage
29: Joining means
30: Reversing drive means
31: Lifter
32: Joined portion
33: Columnar protrusion
34a, 34b: Gripping piece
35a, 35b: Cylinder unit
39, 42: Gripping plate
40: Shock absorber
41: Sensor
20 44: Passive wheel (reversing drive means)
45: Drive wheel (reversing drive means)
46: Switching means (reversing drive means)
47: Motor with reducer (reversing drive means)
49: Up-down swinging plate (switching means)
50: Cylinder unit (switching means)
52, 53: Vertical elevating shaft rod
52a: Rack gear portion
54: Elevating platform
55: Elevating base
56: Elevating drive means
57: Pinion gear (elevating drive means)
58: Motor with reducer (elevating drive means)
59a, 59b: Frustoconical seat
60a, 60b: Fitting
61a, 61b: Vertical shaft rod
63a, 63b: Frustoconical protruded head (interlocking portion)
64a, 64b, 66: Compression coil spring
65: Lid-plate-detecting elevating rod
65b: Detected flange potion
67a, 67b: Side wall plate of elevating base
68: Detected plate
69: Elevating-base descent detecting sensor
70: Lid-plate detecting sensor
71: Aperture
72: Lid plate
72a: Fitting portion of lid plate
73a, 73b: Hole of lid plate (interlocked portion)
74: Interlocked portion
75: Interlocking portion
76: Pantograph mechanism
77: Elevating table
78: Table ceiling plate (engine support base)
79: Pushed-up base portion of elevating table
80a, 80b: Vertical axis roller (carriage positioning means)
81: Guide rail (carriage positioning means)
82: Engaged bar (carriage positioning means)
83: Concave groove portion (carriage positioning means)
84: Engaging hook (carriage positioning means)
85: Actuator (carriage positioning means)
B: Vehicle body (object)
E: Engine (assembly part)

Preferred Embodiment of the Invention

Figure 2:
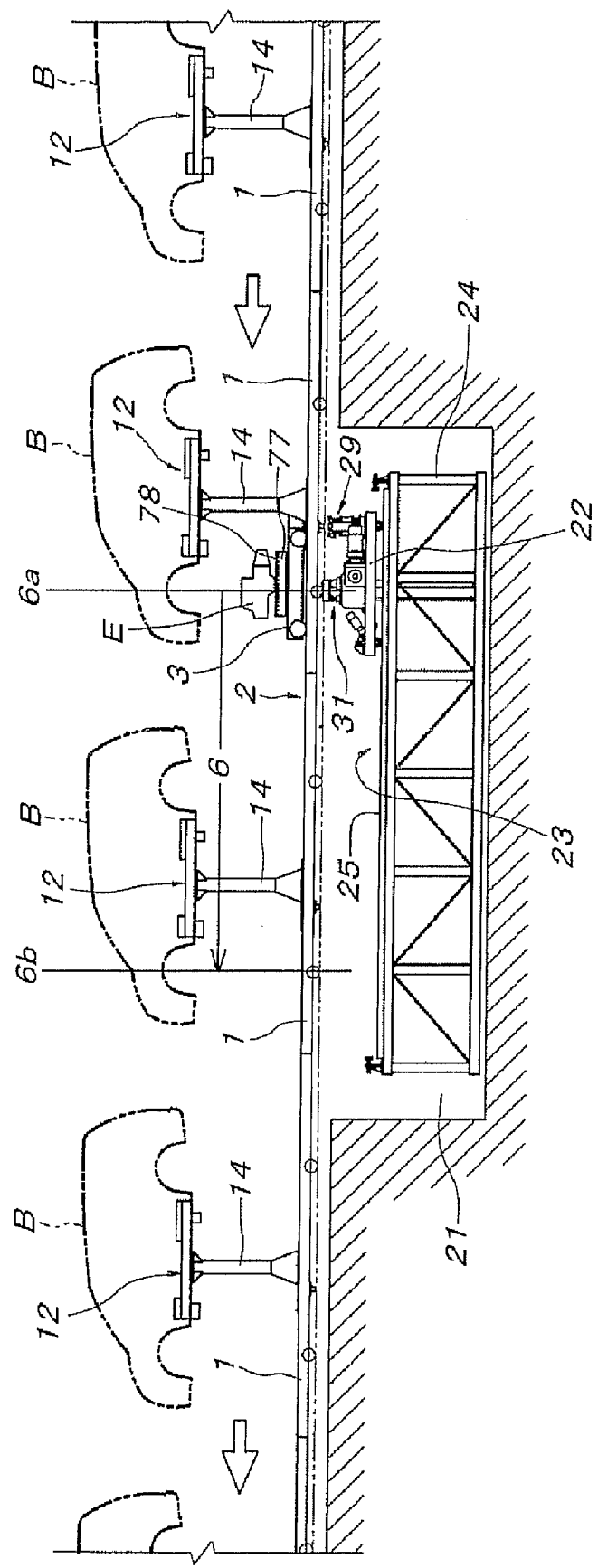
FIG. 2 is a partial, vertical schematic side view showing the engine-assembly-work section.

A specific embodiment of the present invention is described based on the drawings below. In FIGS. 1 and 2, reference numeral 1 denotes a conveyance carriage for conveying a vehicle body B of an automobile as an object. The conveyance carriage 1 continuously travels along a linear traveling route 2 at a constant low speed in a state that the conveyance carriages 1 adjacent forwardly and backwardly contact one another so that flat rectangular carriage floor surfaces 1a of the respective conveyance carriages 1 are continued in a band shape. Reference numeral 3 denotes an engine (assembly part) carrying-in carriage for conveying an engine E as an assembly part. There is utilized a traveling carriage of a conventionally known automatically controlled system configured so as to automatically travel by an automatic pilot on a previously determined traveling route 4, to automatically stop at a fixed stop position set on the traveling route 4, and also, to start traveling in receipt of a moving-off instruction. Furthermore, the traveling route 4 of this engine carrying-in carriage 3 is set as follows: the route is transferred, from on an approach-route floor surface 5a that is formed adjacently to the traveling route 2 of the conveyance carriage 1 and is flush with the carriage floor surface 1a, to a rear-end side of the conveyance carriage 1 onto the carriage floor surface 1a of the conveyance carriage 1 at a start point position 6a in an engine-assembly-work section 6 set in the middle of the traveling route 2 of the conveyance carriage 1; then, the route moves ahead on a centerline on the carriage floor surface 1a of the conveyance carriage 1 and stops at a previously set fixed stop position; and when the conveyance carriage 1 reaches an end point position 6b in the engine-assembly-work section 6, the route moves off from the fixed stop position and can exit from on the carriage floor surface 1a of the conveyance carriage 1 onto a return-route floor surface 5b formed to be flush with the carriage floor surface 1a.

Figure 3:
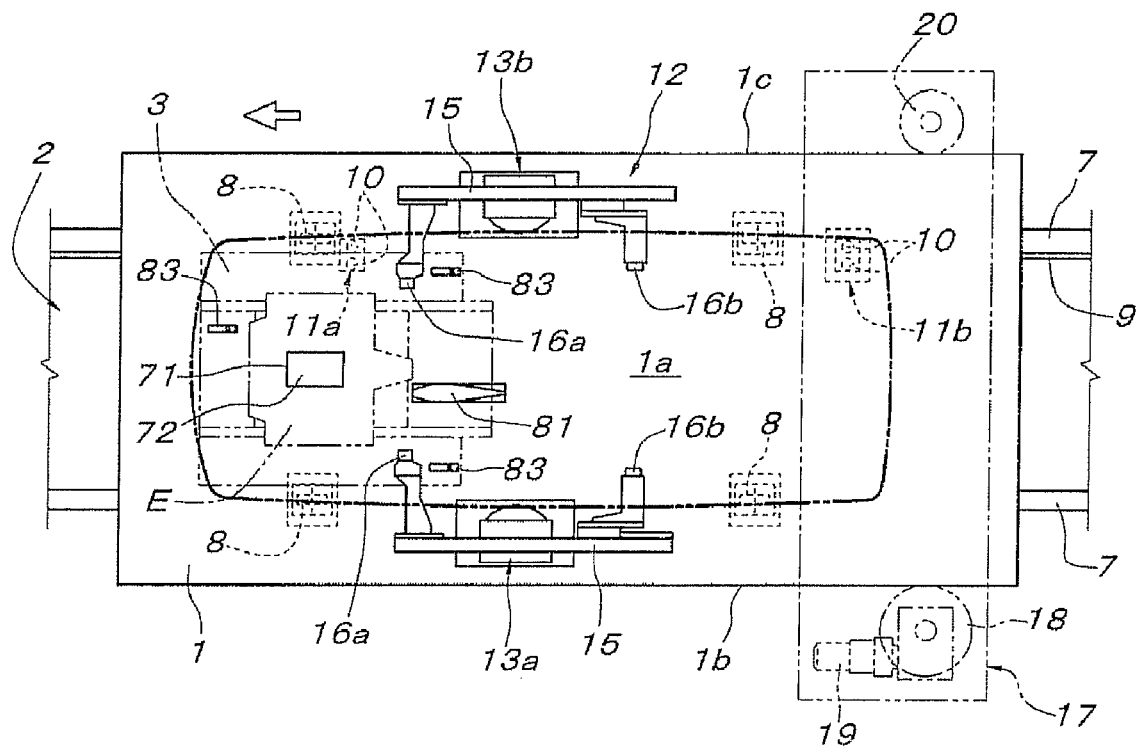
FIG. 3 is a plan view showing a conveyance carriage.
Figure 4:
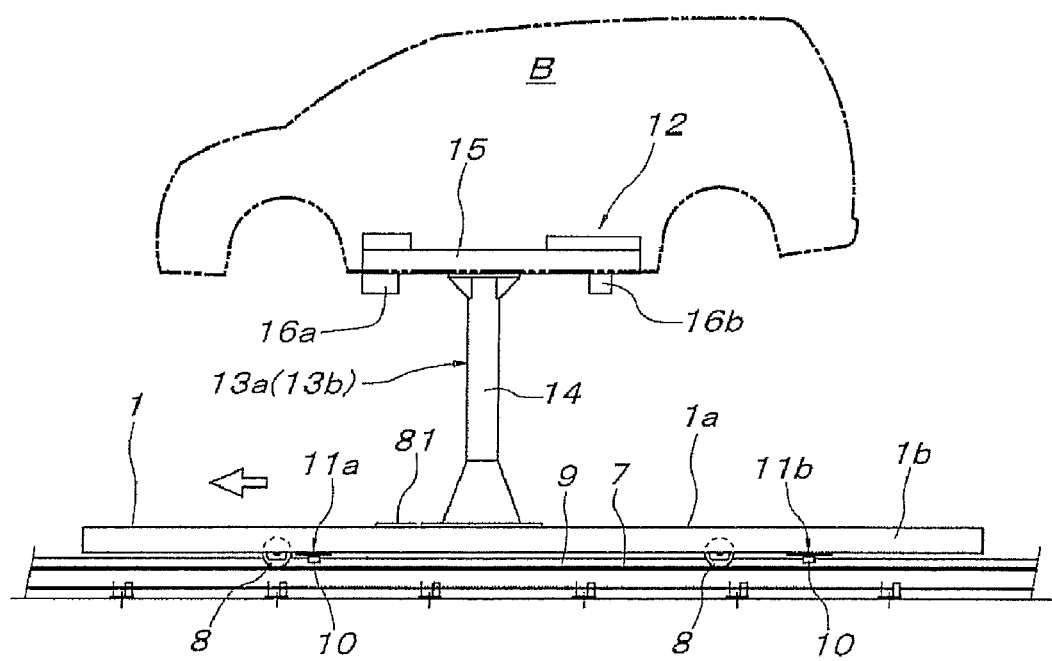
FIG. 4 is a side view showing the conveyance carriage.
Figure 5:
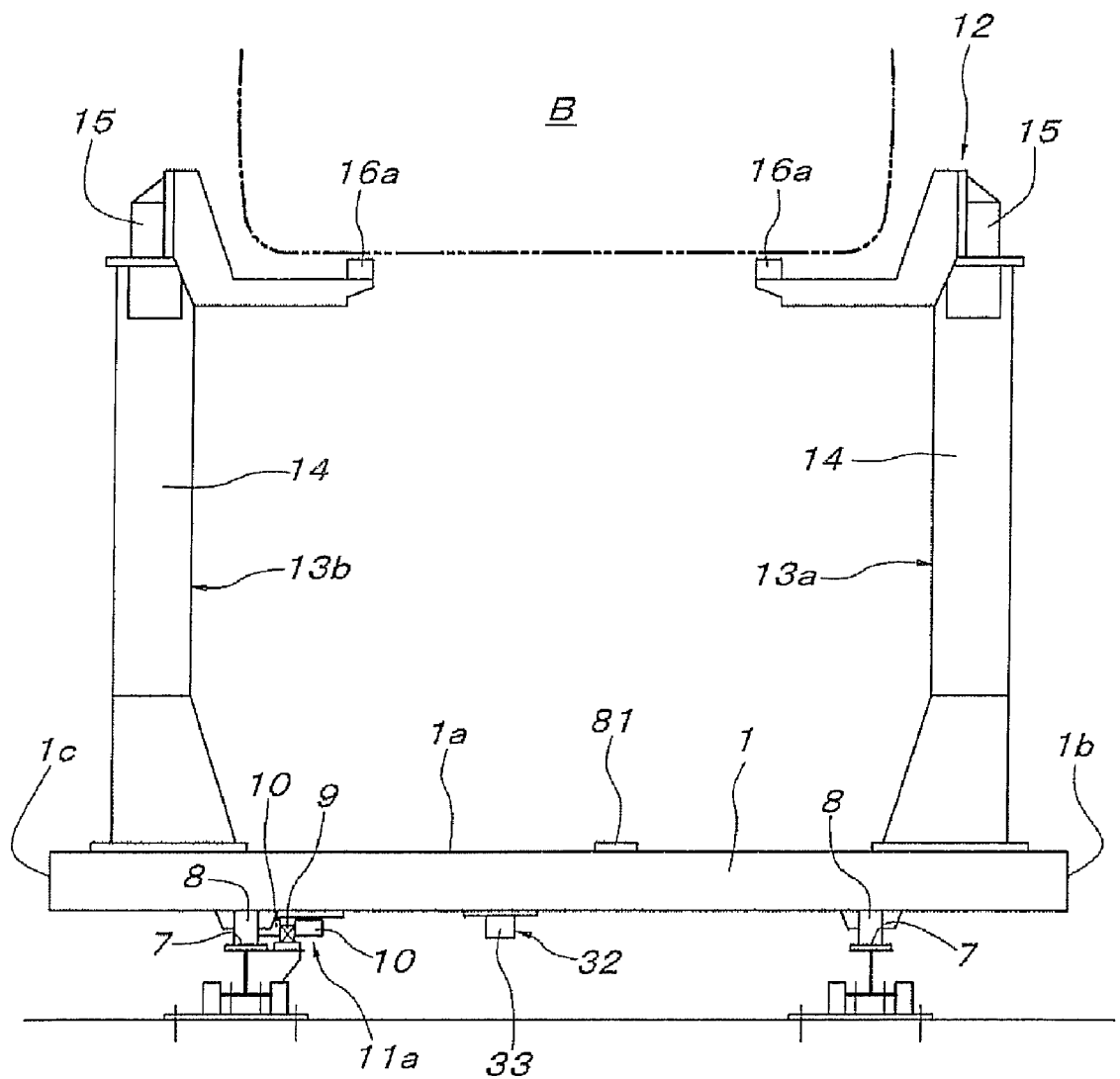
FIG. 5 is a front view showing the conveyance carriage.

As shown in FIGS. 3 to 5, the conveyance carriage 1 is supported by: by two front and rear pairs of left and right wheels 8 that roll on a pair of left and right guide rails 7 laid on the traveling route 2; and two front and rear pairs of oscillation preventive roller units 11a and 11b composed of a pair of left and right vertical axis rollers 10 that sandwich an oscillation preventive guide rail 9 that is juxtaposed on the one-side guide rail 7 from both left and right sides, whereby the conveyance carriage 1 can travel along the traveling route 2. On the flat rectangular carriage floor surface 1a, vehicle-body support means 12 is appended.

This vehicle-body support means 12 is for supporting the vehicle body B at a predetermined height above the carriage floor surface 1a, more specifically, at a height that allows a worker on the carriage floor surface 1a to enter into below the vehicle body B so that the worker can work. The vehicle-body support means 12 is configured by a pair of left and right vehicle-body support units 13a and 13b. The vehicle-body support units 13a and 13b are configured by: a pair of left and right columns 14 installed upright on the both left and right sides of the carriage floor surface 1a so as to be positioned on the both left and right sides of the vehicle body B when observed on the plane; a front-back horizontal beam 15 extending in the both front and back directions from the upper end of each column 14; and vehicle-body (object) support devices 16a and 16b extending in a cantilevered shape inwardly from the both front and back sides of each of these horizontal beams 15. Therefore, the engine carrying-in carriage 3 shown in FIGS. 1 and 2 will travel in the same direction as the traveling direction of the conveyance carriage 1, below the vehicle body B supported by the vehicle-body support means 12, on the carriage floor surface 1a between the columns 14 of the pair of left and right vehicle-body support units 13a and 13b. The engine carrying-in carriage 3 will automatically stop at a fixed stop position at which the engine E supported by this engine carrying-in carriage 3 is positioned directly below an engine attaching position of the vehicle body B.

Although any system may be used as drive means for causing the conveyance carriage 1 to travel along the traveling route 2, friction drive means 17 indicated by a virtual line in FIG. 3, for example, may be utilized. For this friction drive means 17, both left and right side surfaces 1b and 1c parallel to the traveling direction of the conveyance carriage 1 are defined as friction drive surfaces. The friction drive means 17 is conventionally well known as it is configured by a friction drive roller 18 pressure-contacting one side surface 1b, a motor 19 for rotation-driving the roller 18, and a backup roller 20 contacting the other side surface 1c. The friction drive means 17 is disposed on an entry side of an automobile assembly work line, including the engine-assembly-work section 6, in the middle of the traveling route 2 and braking means which is identically structured as the friction drive means 17 and in which a slightly low rotation speed of the friction drive roller 18 is set is disposed on an exit side. Thereby, in the automobile assembly work line, in a state that the conveyance carriages 1 adjacent forwardly and backwardly contact one another as described above, and the flat rectangular carriage floor surface 1a of each conveyance carriage 1 is continued in a band shape, the conveyance carriage 1 can be continuously traveled at a fixed low speed.

As shown in FIG. 2, below the engine-assembly-work section 6 set in the middle of the traveling route 2 of the conveyance carriage 1, a pit 21 is arranged along the traveling route 2, and within the pit 21, a traveling route 23 of a synchronous travel carriage 22 is arranged. On the traveling route 23 of the synchronous traveling carriage 22, the synchronous traveling carriage 22 linearly moves back and forth below the traveling route 2 between the start point position 6a and the end point position 6b in the engine-assembly-work section 6. The traveling route 23 is configured by a pair of left and right guide rails 25 laid on a mount 24 within the pit 21.

Figure 6:
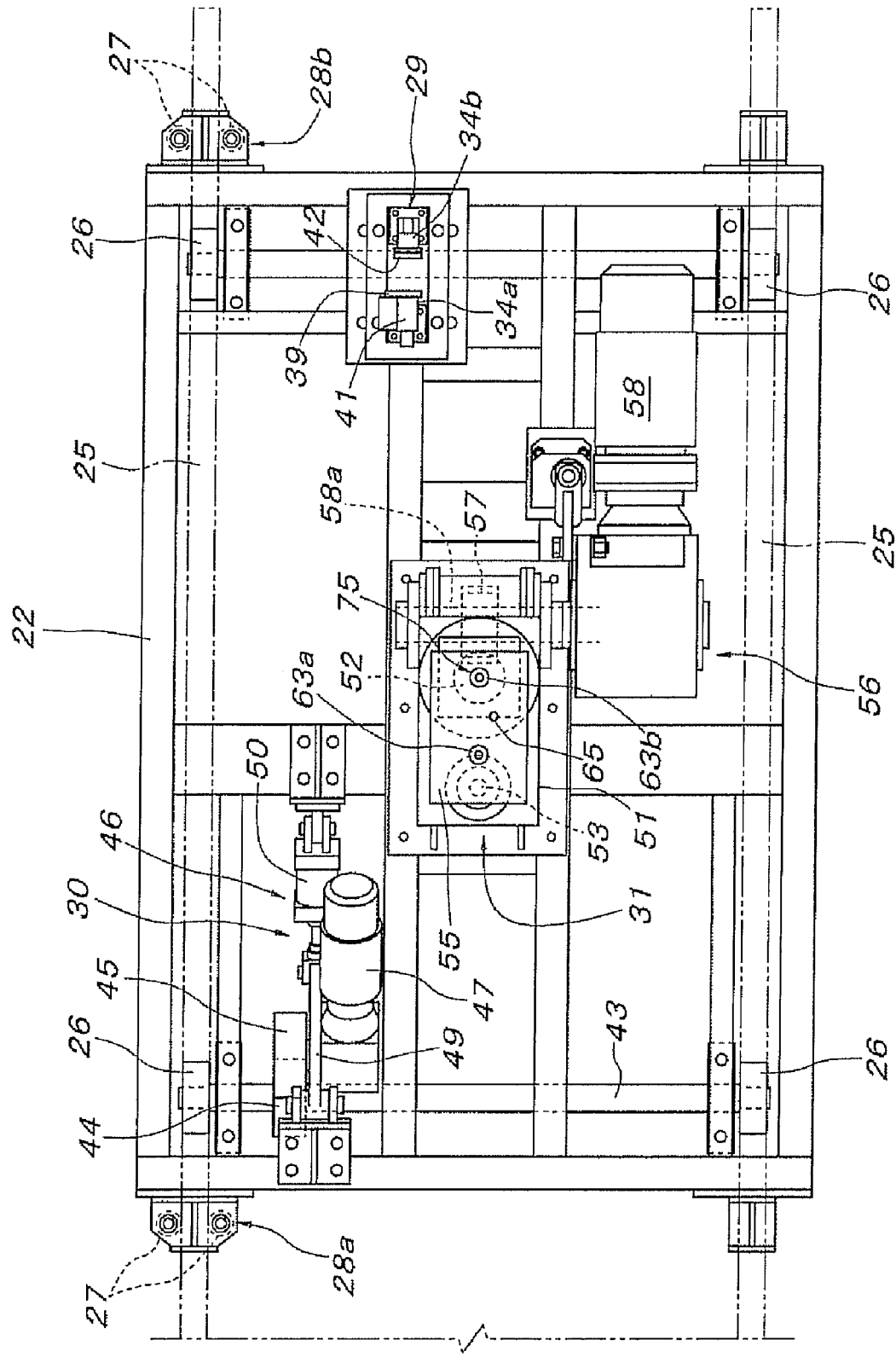
FIG. 6 is a plan view showing a synchronous traveling carriage.
Figure 7:
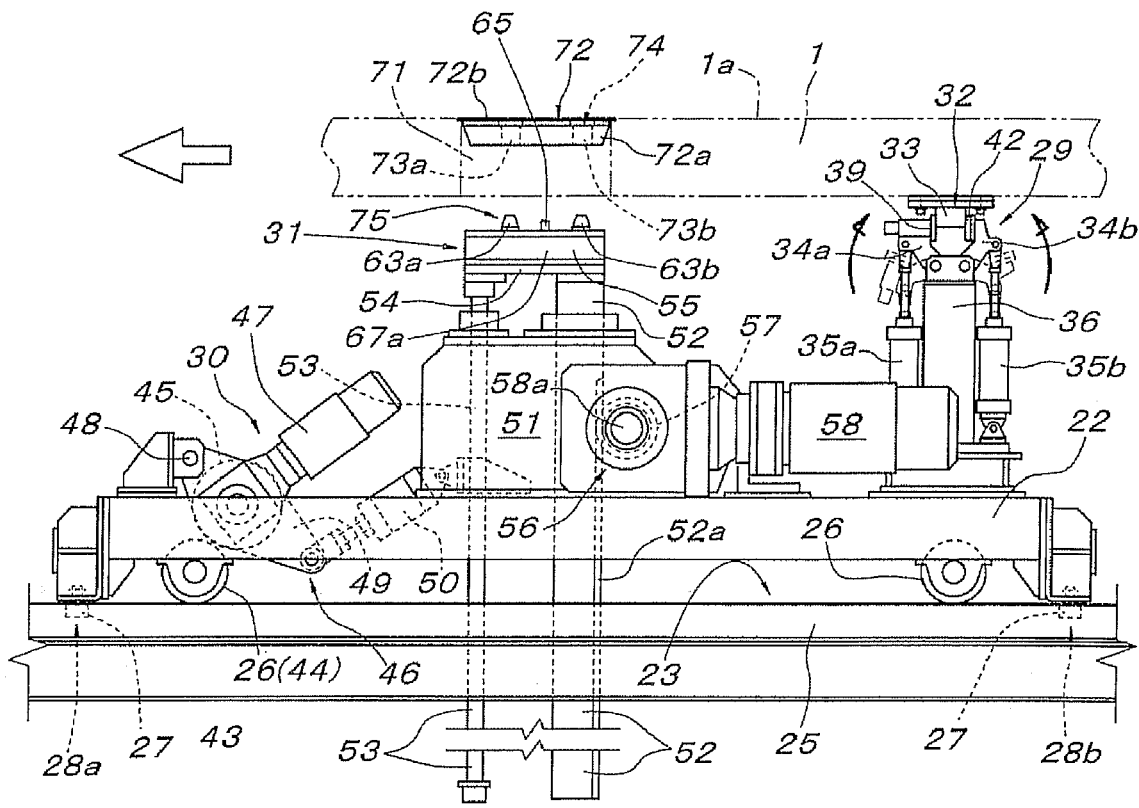
FIG. 7 is a side view showing the synchronous traveling carriage.

As shown in FIGS. 6 and 7, the synchronous traveling carriage 22 is supported by two front and rear pairs of left and right wheels 26 that roll on the pair of left and right guide rails 25, and two front and rear pairs of oscillation preventive roller units 28a and 28b composed of a pair of left and light vertical axis rollers 27 sandwiching the one-side guide rail 25 from both left and right sides so that the synchronous traveling carriage 22 can travel along the traveling route 23. The synchronous traveling carriage 22 is provided with joining means 29 for coupling the synchronous traveling carriage 22 to the conveyance carriage 1 so as to synchronously travel in the advancing direction, reversing drive means 30, and a lifter 31.

Figure 14:
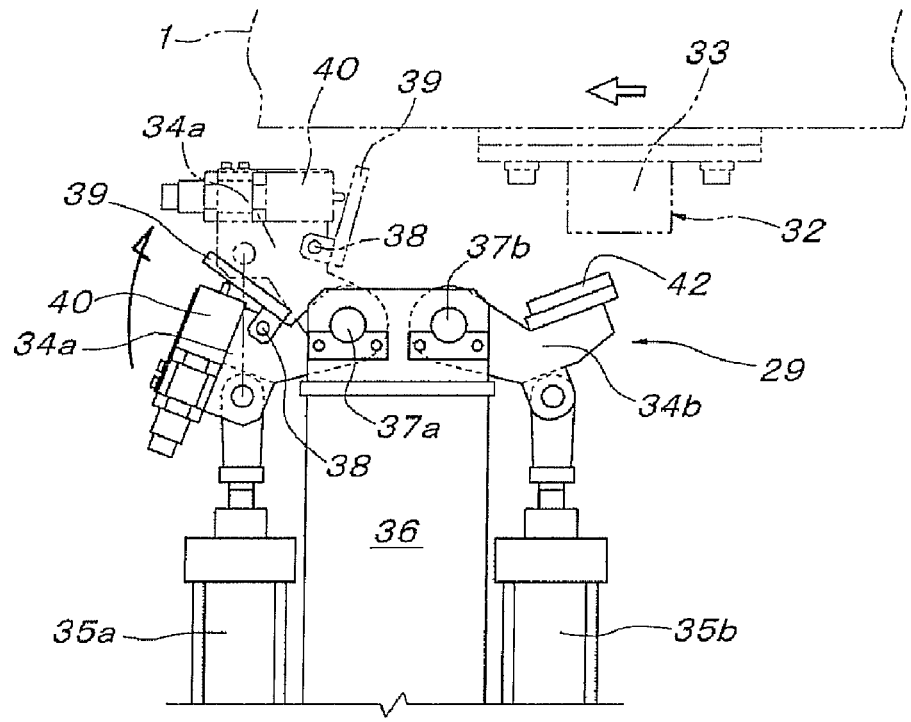
FIG. 14 is a side view showing that joining means on the synchronous traveling carriage side is in a joining cancelled state.
Figure 15:
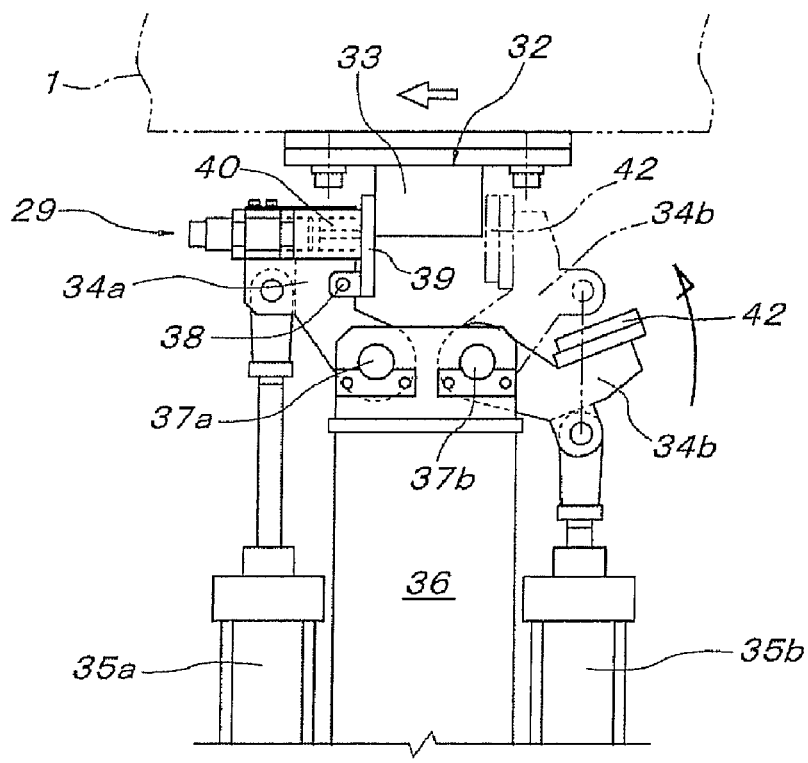
FIG. 15 is a side view showing that the joining means is at a first stage of a joining action.
Figure 16:
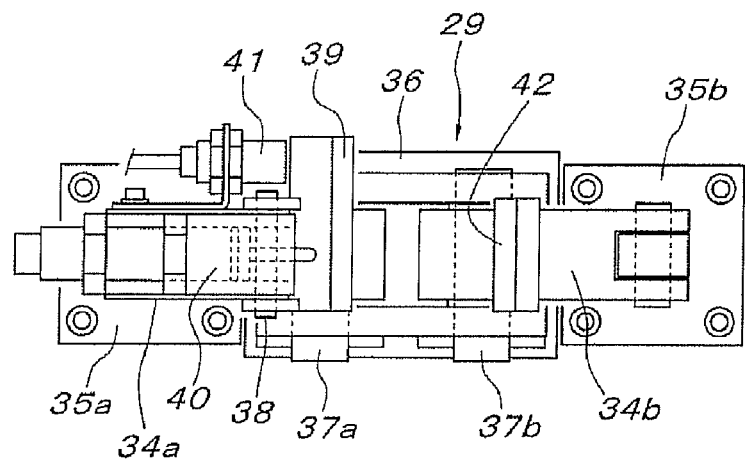
FIG. 16 is a plan view showing the joining means.

The joining means 29 can be joined to and detached from a joined portion 32 arranged on the bottom of the conveyance carriage 1, as its detailed structure is shown in FIGS. 14 to 16. The joined portion 32 is configured by a prismatic protrusion, i.e., a columnar protrusion 33 in a rectangular cross section, which is protrudingly provided downwardly at the bottom of the conveyance carriage 1. The joining means 29 is configured by a pair of front and rear openable, closable gripping pieces 34a and 34b that grip the columnar protrusion 33 from the both front and back sides of the traveling direction of the conveyance carriage 1, and cylinder units 35a and 35b (that act as actuators) for separately driving to open and close the gripping pieces 34a and 35b. To be described in more detail, the pair of front and rear openable, closable gripping pieces 34a and 34b are pivotally supported by left-right horizontal support shafts 37a and 37b to freely rise and fall in the front-back and up-down directions, on the both front and back sides of the upper end of a strut member 36 installed upright on the synchronous traveling carriage 22. The front-side gripping piece 34a is attached with a gripping plate 39 of which the lower side is pivotally supported to freely swing forwardly and backwardly within a fixed range by the left-right horizontal support shaft 38, a shock absorber 40 for urging this gripping plate 39 in a backwardly inclined posture, and a sensor 41 for detecting a state that the gripping plate 39 is received on the distal end surface of the shock absorber 40 as a result of the gripping plate 39 being swung forwardly against the urging force of the shock absorber 40. The rear-side gripping piece 34b is attached with a fixed gripping plate 42.

Figure 8:
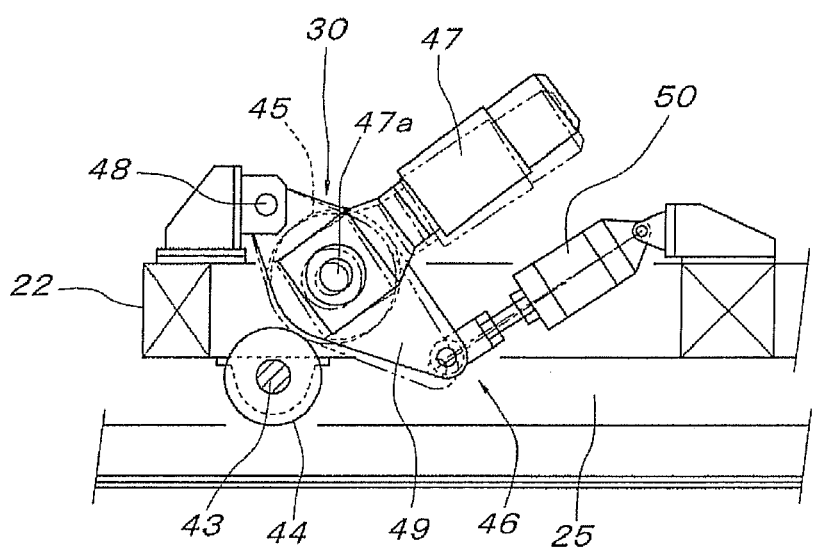
FIG. 8 is a vertical sectional side view showing reversing drive means of the synchronous traveling carriage.

As shown in FIGS. 6 to 8, the reversing drive means 30 is configured by a passive wheel 44 arranged in the axle 43 attached with the pair of front-side left and right wheels 26 of the synchronous traveling carriage 22, a drive wheel 45 pressure-contacting this passive wheel 44, switching means 46 for switching the drive wheel 45 between the drive wheel 45 pressure-contacting the passive wheel 44 and the drive wheel 45 being separated from the passive wheel 44; and a motor with a reducer 47, for rotation-driving the drive wheel 45. Specifically, in the synchronous traveling carriage 22, an up-down swinging plate 49 is pivotally supported to freely swing upwardly and downwardly by the left-right horizontal support shaft 48. One side surface of the up-down swinging plate 49 is attached with the motor with a reducer 47. An output shaft 47a of the motor with a reducer 47, i.e., an output shaft 47a that is parallel to the axle 43 and is protruding horizontally (in the left-right direction) to the other surface side of the up-down swinging plate 49, is attached with the drive wheel 45. Between a free end of the up-down swinging plate 49 and the synchronous traveling carriage 22, a cylinder unit 50 as an actuator for vertically driving the up-down swinging plate 49 is interposed. Therefore, the switching means 46 is configured by the up-down swinging plate 49 and the cylinder unit 50 for supporting the drive wheel 45 and the motor with a reducer 47.

As shown in FIGS. 6 and 7, the lifter 31 is configured by: two front and rear vertical elevating shaft rods 52 and 53, which are disposed at the substantially center position of the synchronous traveling carriage 22 and supported elevatably to a casing 51 fixed on the synchronous traveling carriage 22, an elevating platform 54 supported at upper ends of these two vertical elevating shaft rods 52 and 53, an elevating base 55 supported on the elevating platform 54, and elevating drive means 56. More specifically, in a lengthwise direction of one vertical elevating shaft rod 52 with a larger diameter, a rack gear portion 52*a* is arranged. The motor with a reducer 58 for forwardly and reversely rotation-driving a pinion gear 57 pivotally supported within the casing 51 in a manner to be occluded to this rack gear portion 52*a* by the output shaft 58*a* protruding horizontally (in the left-right direction) is disposed at a lateral side portion of the casing 51. The elevating drive means 56 is configured by the rack gear portion 52*a*, the pinion gear 57, and the motor with a reducer 58. It is noted that the vertical elevating shaft rod 53 with a smaller diameter is for preventing the elevating platform 54 from rotating around the vertical elevating shaft rod 52 with a larger diameter. Furthermore, when being configured by a pipe material, the vertical elevating shaft rod 53 with a smaller diameter can be utilized as a wire protective tube for guiding wirings for sensors disposed in the elevating platform 54 toward the synchronous traveling carriage 22 side.

As shown in FIGS. 10 to 13, the elevating platform 54 and the elevating base 55 of the lifter 31 are the same in size and rectangular in plane. In the elevating platform 54, a pair of front and rear frustoconical seats 59*a* and 59*b* are upwardly provided protrudingly and fixed. The bottom surface of the elevating base 55 is attached with a pair of front and rear fittings 60*a* and 60*b*. On the bottom surface of each of the fittings 60*a* and 60*b*, there is provided a trumpet-shaped and downwardly expanded concave portion vertically fittingly with and detachably from the seats 59*a* and 59*b*. A pair of front and rear vertical shaft rods 61*a* and 61*b* are arranged in a manner to penetrate concentrically across these seats 59*a* and 59*b* and the fittings 60*a* and 60*b*. In each of the vertical shaft rods 61*a* and 61*b*, lower-end expanded portions 62*a* and 62*b* received inside the seats 59*a* and 59*b* and frustoconical protruded heads 63*a* and 63*b* received by the top surface of the elevating base 55 are arranged. Between the elevating platform 54 and the elevating base 55, a pair of front and rear compression coil springs 64*a* and 64*b* are interposed in a state of being fitted at the outside of the fittings 60*a* and 60*b*. Therefore, the elevating base 55 can be ascended and moved parallel to the elevating platform 54 up to a height that is restricted by the lower-end expanded portions 62*a* and 62*b* and the protruded heads 63 a and 63*b* of the pair of front and rear vertical shaft rods 61*a* and 61*b*, and also, is urged and maintained at an ascended position indicated in FIGS. 10, 12, and 13A by the pair of front and rear compression coil springs 64*a* and 64*b*.

A lid-plate detecting elevating rod 65 that vertically penetrates the elevating platform 54 and the elevating base 55 is disposed at a position slightly deviated to the lateral side between the pair of front and rear vertical shaft rods 61*a* and 61*b*. This lid-plate detecting elevating rod 65 is provided with an intermediate flange portion 65*a* positioned below the elevating base 55 and a detected flange portion 65*b* attached at the lower end that is positioned downwardly of the elevating platform 54. By the compression coil spring 66 fitted at the outside of the lid-plate detecting elevating rod 65 between the intermediate flange portion 65*a* and the elevating platform 54, the intermediate flange portion 65*a* contacts the bottom surface of the elevating base 55, and also, an upper end 65c of the lid-plate detecting elevating rod 65 is urged and maintained at an ascended position protruded upwardly from the top surface of the elevating base 55. It is noted that the urging force for pushing up the elevating base 65 by the pair of front and rear compression coil springs 64*a* and 64*b* is configured to be significantly larger as compared to the urging force of the compression coil spring 66 for pushing up the elevating base 65 via the intermediate flange portion 65*a* of the lid-plate detecting elevating rod 65.

Figure 12:
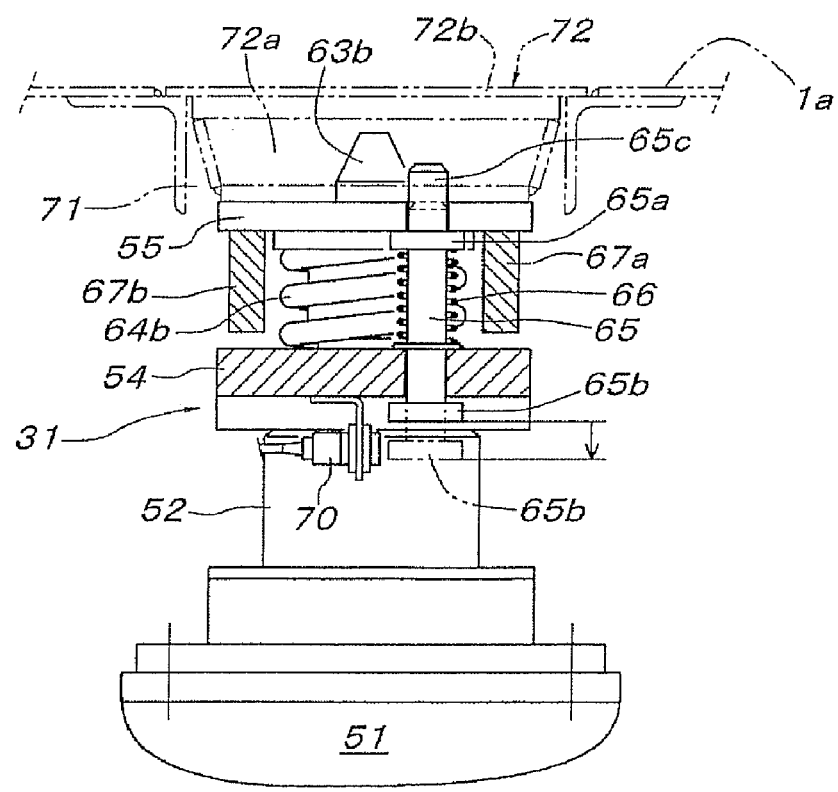
FIG. 12 is a vertical sectional side view of the upper end portion of the lifter.
Figure 13:
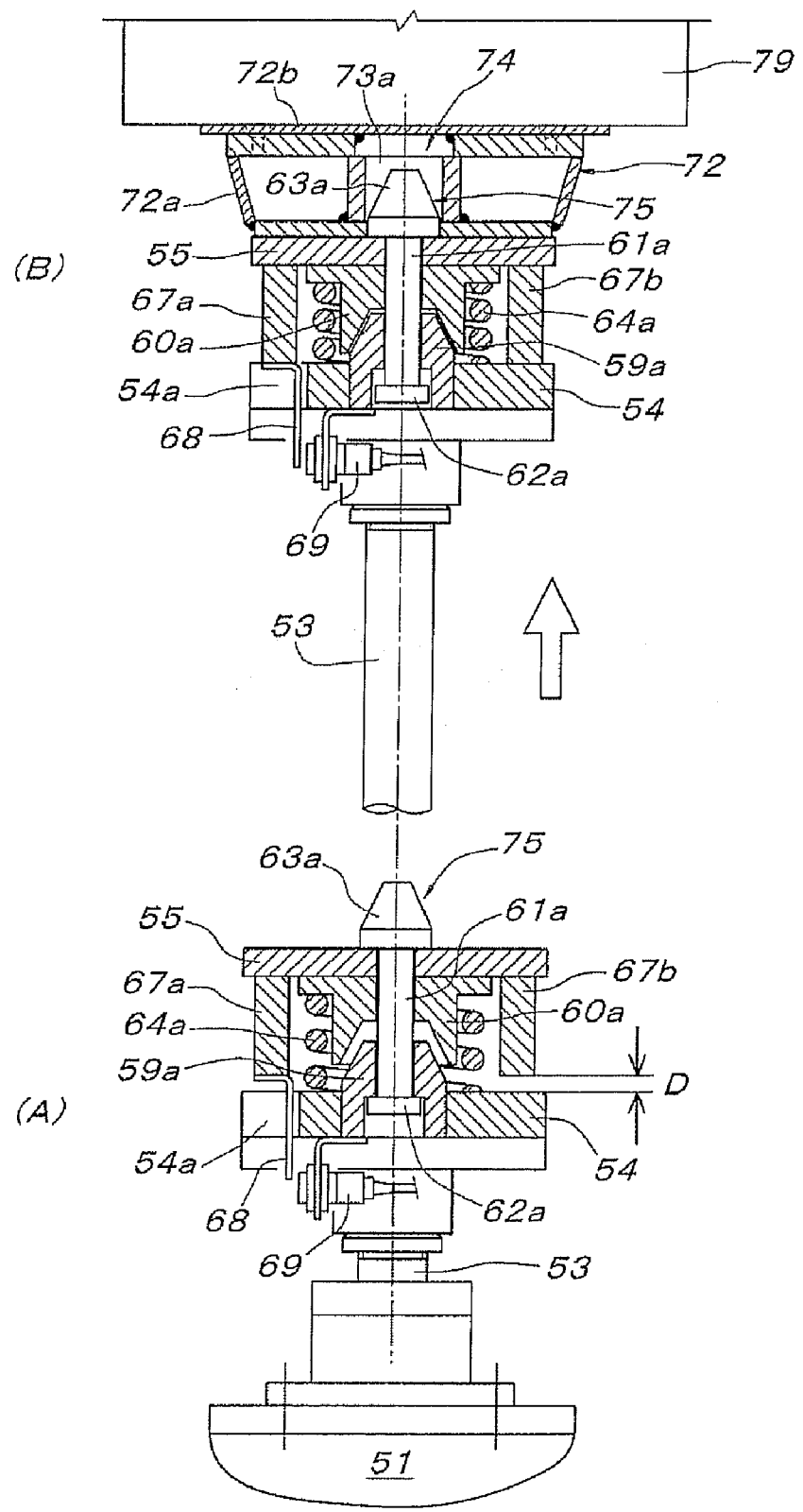
FIG. 13A is a vertical sectional side view showing that the upper end portion of the lifter is at a descended position.
FIG. 13B is a vertical sectional side view showing that the upper end portion of the lifter pushes up the lid plate of the aperture on the conveyance carriage side, together with a pushed-up base portion on the engine carrying-in carriage side.

Furthermore, on the bottom surface of the elevating base 55, side wall plates 67*a* and 67*b* are attached along both left and right edges. When the lower ends of the both side wall plates 67*a* and 67*b* contact the top surface of the elevating platform 54, descending of the elevating base 55 for the elevating platform 54 can be regulated. Therefore, the elevating base 55 can be elevated within a range of a gap D (see FIG. 13A) between the lower ends of the both side wall plates 67*a* and 67*b* and the top surface of the elevating platform 54 when the elevating base 55 is urged and maintained at the ascended position by the urging force of the compression coil springs 64*a* and 64*b*. Below the elevating platform 54, there is attached an elevating-base descent detecting sensor 69 for detecting that the elevating base 55 has reached a descended position where the lower ends of the both side wall plates 67*a* and 67*b* contact the top surface of the elevating platform 54. This detection is sensed via a detected plate 68 that is attached to the lower end of the one-side wall plate 67*a* and that extends downwardly from the cutout portion 54*a* of the elevating platform 54. Also, as shown in FIG. 12, below the elevating platform 54, a lid-plate detecting sensor 70 is attached. The lid-plate detecting sensor 70 is for detecting that the lid-plate detecting elevating rod 65 descends against the urging force of the compression coil spring 66 from the ascended position (position where the upper end 65c protrudes upwardly of the elevating base 55 at the ascended position) to the descended position (position where the upper end 65c is flush with the top surface of the elevating base 55 at the ascended position) via the detected flange portion 65*b* at the lower end of the lid-plate detecting elevating rod 65.

Figure 10:
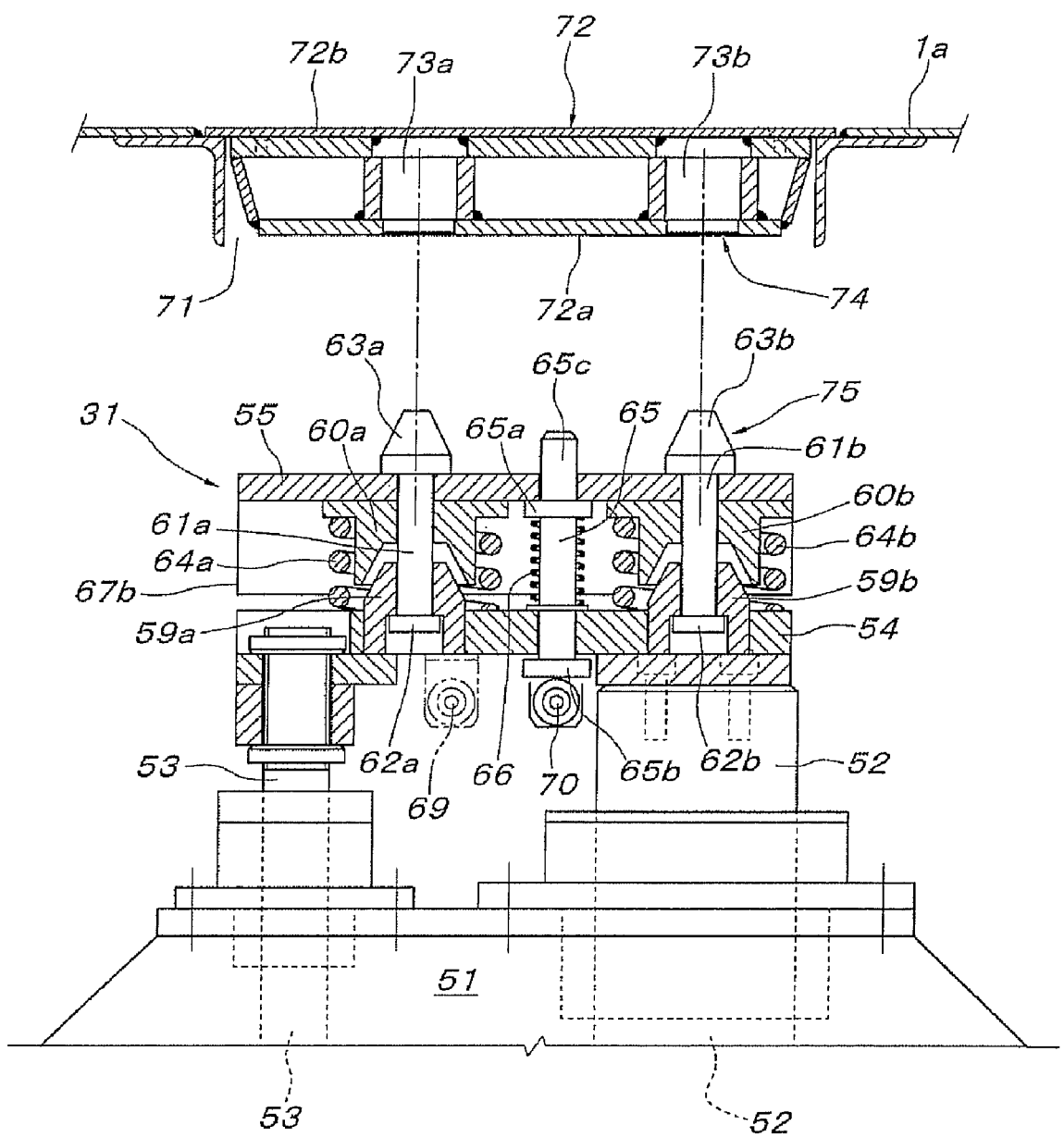
FIG. 10 is a vertical sectional side view showing an upper end portion of an aperture with a lid plate on a conveyance carriage side and a lifter on a synchronous traveling carriage side.
Figure 11:
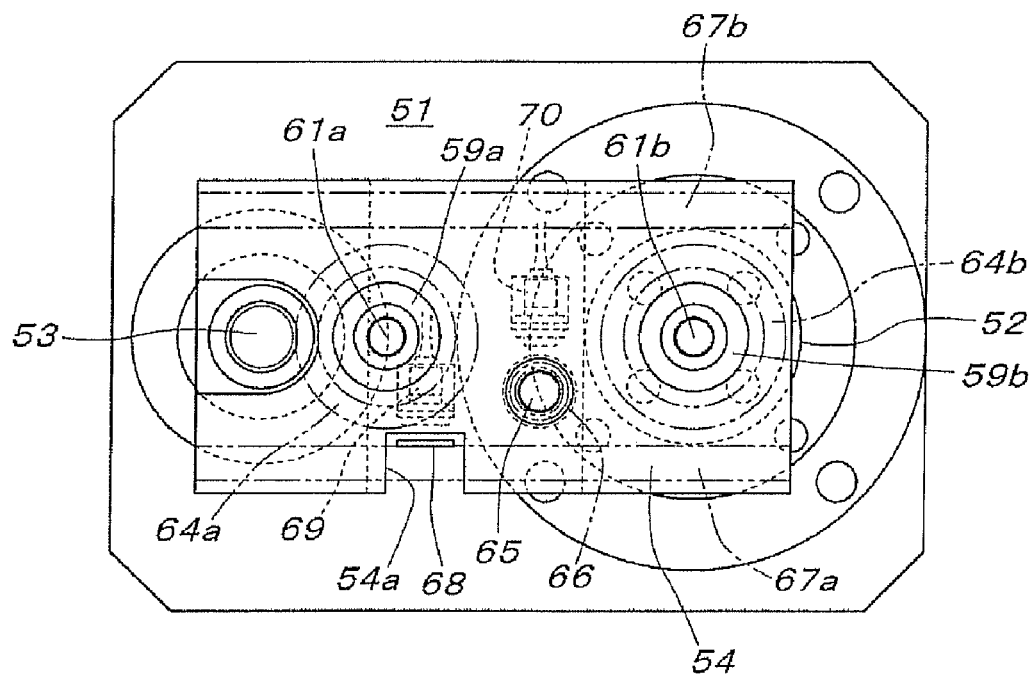
FIG. 11 is a cross-sectional plan view of an upper end portion of the lifter.

On the carriage floor surface 1*a* of the conveyance carriage 1, an aperture 71 is arranged. As described previously, this aperture 71 is positioned directly above the elevating base 55 of the lifter 31 on the synchronous traveling carriage 22 side when the conveyance carriage 1 and the synchronous traveling carriage 22 are joined for integration as a result of the pair of front and rear gripping pieces 34*a* and 34*b* of the joining means 29 on the synchronous traveling carriage 22 side gripping the joined portion 32 (columnar protrusion 33) of this conveyance carriage 1. The aperture 71 is rectangular in plane having a sufficient size for the elevating base 55 (elevating platform 54) to penetrate and elevate. In this aperture 71, a detachable lid plate 72 for opening and closing the aperture 71 is combined, as shown in FIG. 10. This lid plate 72 is configured by: a rectangular-plane fitted portion 72*a* of which the size is just fitted within the aperture 71 and of which the peripheral side surface is inclined to be tapered off downwardly; and a cover plate 72*b* of which the periphery is projected and which is laid on the fitted portion 72*a*. The periphery of this cover plate 72*b* is supported on the peripheral top surface of the aperture 71. In the fitted portion 72*a* of this lid plate 72, a pair of front and rear holes 73*a* and 73*b* into which the pair of front and rear frustoconical protruded heads 63*a* and 63*b* that are protruded from the top surface of the elevating base 55 can be fitted are formed. That is, the holes 73*a* and 73*b* of the lid plate 72 configure an interlocked portion 74, and the protruded heads 63*a* and 63*b* on the elevating base 55 side configure an interlocking portion 75 that are each interlocked with the interlocked portion 74 for positioning the lid plate 72. It is noted that a portion for supporting the periphery of the lid plate 72 (periphery of the cover plate 72b) is configured to be lowered by one level (that corresponds to the thickness of the cover plate 72b) so that the top surface of the lid plate 72 (top surface of the cover plate 72b) and the carriage floor surface 1a are flush with each other when the lid plate 72 closes the aperture 71.

Figure 9:
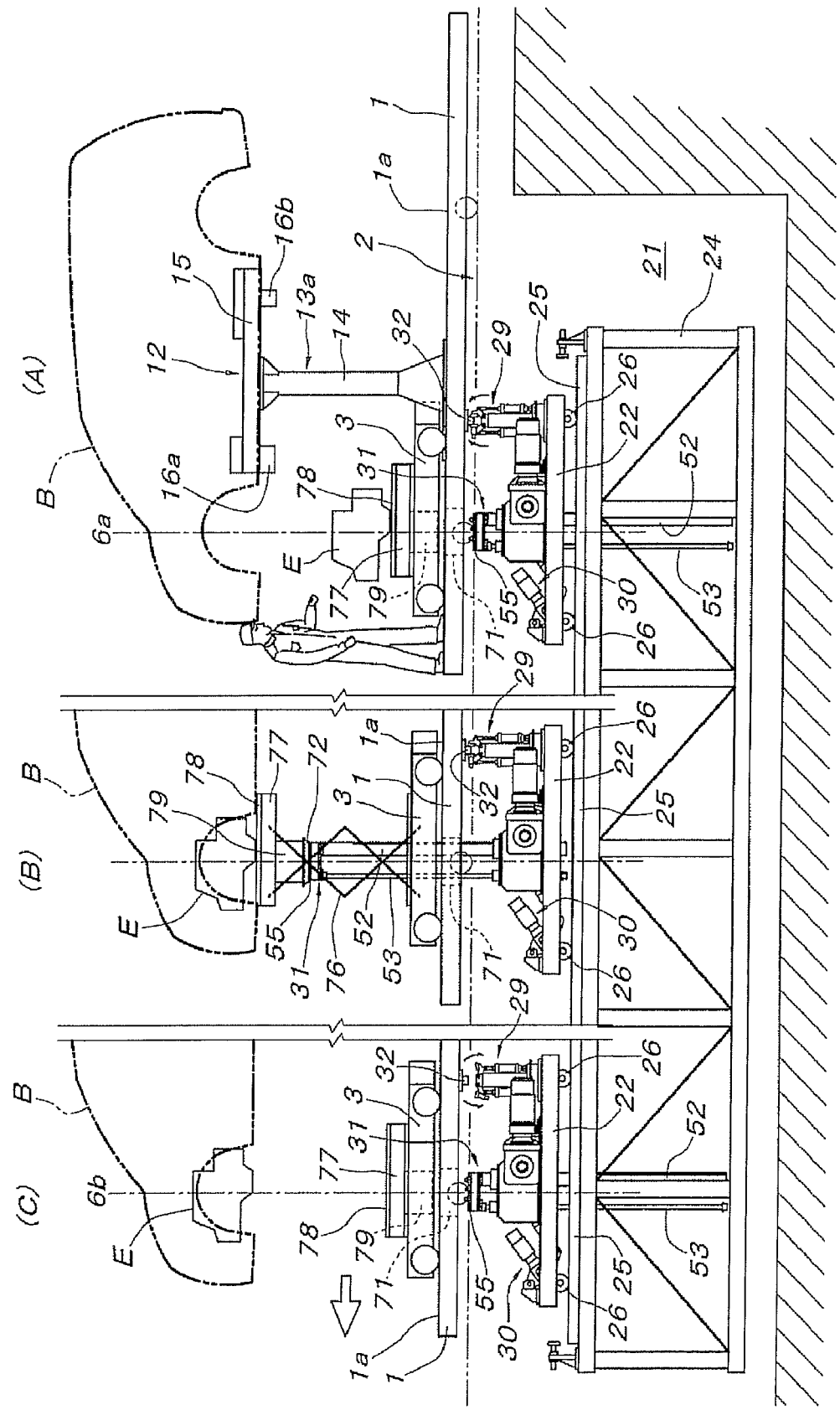
FIGS. 9A to 9C are side views each describing an action of the synchronous traveling carriage at each position in the engine-assembly-work section.

The usage method and the action of one embodiment of the thus configured present invention are described below. As shown in FIGS. 2 and 9A, the synchronous traveling carriage 22 having the elevating base 55 of the lifter 31 at the descended position is returned to the start point position 6a in the engine-assembly-work section 6. The drive wheel 45 of the reversing drive means 30 of the synchronous traveling carriage 22 at this time is separated from the passive wheel 44 as a result of the up-down swinging plate 49 being pulled upwardly by the cylinder unit 50 of the switching means 46, as shown in FIGS. 7 and 8. At this time, the synchronous traveling carriage 22 is in a free state. Furthermore, as indicated by a solid line in FIG. 14, out of the pair of front and rear gripping pieces 34a and 34b that are in an opened, lodged state forwardly and backwardly of the joining means 29, the front-side gripping piece 34a only is pushed up upwardly and backwardly by the cylinder unit 35a. Thereby, the gripping piece 34a is switched to an erected posture as shown by a virtual line in FIG. 14, and is protruded within a moving route of the joined portion 32 (columnar protrusion 33) on the conveyance carriage 1 side. At this time, the gripping plate 39 of the front-side gripping piece 34a is in a posture inclined backwardly by the urging force of the shock absorber 40.

On the other hand, one conveyance carriage 1 out of a line of the conveyance carriages 1 that travel on the traveling route 2 in a seamlessly connected state reaches the start point position 6a in the engine-assembly-work section 6. On the carriage floor surface 1a of the conveyance carriage 1, the engine carrying-in carriage 3 that automatically travels on the traveling route 4 as shown in FIG. 1 is ridden from on the approach-route floor surface 5a, and the engine carrying-in carriage 3 is automatically stopped at the fixed stop position on the carriage floor surface 1a of the conveyance carriage 1.

Thereafter, the conveyance carriage 1 reaches the start point position 6a in the engine-assembly-work section 6. Thereby, the joined portion 32 on the bottom of the conveyance carriage 1, i.e., a vertical front surface of the columnar protrusion 33 that protrudes downwardly, presses and swings the gripping plate 39 of the front-side gripping piece 34a in an erected posture of the joining means 29 on the synchronous traveling carriage 22 side forwardly against the urging force of the shock absorber 40, as shown in FIG. 15. Thereby, the gripping plate 39 is switched to an erected posture where it contacts a distal end surface of the shock absorber 40. As a result, the gripping plate 39 approaches the sensor 41, and thereby, the sensor 41 is switched to a state of detecting (ON state) the gripping plate 39. Based on a gripping-plate detection signal of the sensor 41, as indicated by a virtual line in FIG. 15, the rear-side gripping piece 34b is pushed up upwardly and forwardly by the cylinder unit 35b, and thereby, the rear-side gripping piece 34b is switched to an erected posture. As a result, the joined portion 32 (columnar protrusion 33) on the conveyance carriage 1 side is gripped by the pair of front and rear gripping pieces 34a and 34b (gripping plates 39 and 42) of the joining means 29 on the synchronous traveling carriage 22 side, thereby the conveyance carriage 1 and the synchronous traveling carriage 22 are joined for integration.

When the conveyance carriage 1 and the synchronous traveling carriage 22 are joined for integration as described above, in a state that the elevating base 55 at the descended position on the synchronous traveling carriage 22 side is positioned directly below the aperture 71 of the carriage floor surface 1a of the conveyance carriage 1, the synchronous traveling carriage 22 is pulled by the conveyance carriage 1 so that synchronous traveling is started. Thus, the elevating drive means 56 of the lifter 31 on the synchronous traveling carriage 22 side is actuated to ascend the elevating base 55. That is, the motor with a reducer 58 is operated to rotation-drive the pinion gear 57 so that the vertical elevating shaft rod 52 is ascended and moved via the rack gear portion 52a. As a result, the elevating platform 54 and the elevating base 55 thereon, together with the vertical elevating shaft rod 53, are ascended and moved. As a result, the elevating base 55 pushes up the lid plate 72 that blocks the aperture 71 of the carriage floor surface 1a on the conveyance carriage 1 side. When the position of the lid plate 72 relative to the elevating base 55 is normal at this time, the protruded heads 63a and 63b (i.e., the interlocking portion 75 on the elevating base 55 side) are fitted into the holes 73a and 73b (i.e., the interlocked portion 74 on the lid plate 72 side), and as a result, the lid plate 72 is supported on the elevating base 55. Therefore, as indicated by a virtual line in FIG. 12, the lid-plate detecting elevating rod 65 on the elevating base 55 side is pushed down by the lid plate 72, and the lid-plate detecting sensor 70 is actuated. Thus, by the lid-plate detection signal of the lid-plate detecting sensor 70, the pushing-up operation of the elevating base 55 can be continued. However, when a positional deviation that may not allow the protruded heads 63a and 63b to be fitted into the holes 73a and 73b occurs between the elevating base 55 and the lid plate 72, the lid plate 72 is supported by the protruded heads 63a and 63b, and thus, the lid-plate detecting elevating rod 65 cannot be pushed down. That is, the lid-plate detection signal is not transmitted from the lid-plate detecting sensor 70 within a predetermined time. Thus, regarding it as abnormal, the actuation of the lifter 31 is cancelled, a warning is issued, and also, the elevating base 55 can be descended.

The ascent of the elevating base 55 of the lifter 31 pushes up the lid plate 72 on the conveyance carriage 1 side, and as a result, the elevating base 55 and the elevating platform 54 that have supported the lid plate 72 penetrate and move upwardly of the aperture 71 of the carriage floor surface 1a of the conveyance carriage 1. On the other hand, in the engine carrying-in carriage 3 that has stopped at the fixed stop position on the carriage floor surface 1a of the conveyance carriage 1, an elevating table 77 supported in a manner to be elevated parallel only by a pantograph mechanism 76, for example, is arranged, as shown in FIG. 9B. Above this elevating table 77, a table ceiling plate 78 as an assembly-part supporting base is supported in a state capable of sliding on a horizontal two-dimensional plane within a fixed range. Below the elevating table 77, a pushed-up base portion 79 is arranged. The pushed-up base portion 79 is loosely fitted within a vertically penetrating aperture arranged in the engine carrying-in carriage 3 when this elevating table 77 is at the lower limit position. The vertically penetrating aperture in which the pushed-up base portion 79 is loosely fitted is positioned directly above the aperture 71 of the carriage floor surface 1a of the conveyance carriage 1 when the engine carrying-in carriage 3 is stopped at the fixed stop position on the conveyance carriage 1. The penetrating aperture is sized so that the elevating base 55 on the synchronous traveling carriage 22 side, together with the supporting lid plate 72, can penetrate, ascend, and move.

It is noted that an engine supporting attachment may be attached on the table ceiling plate 78 of the elevating table 77 so as to use the table ceiling plate 78 as an engine supporting base, and a dedicated engine support base provided with the engine supporting attachment may be carried on the table ceiling plate 78.

When the ascent of the elevating base 55 of the lifter 31 on the synchronous traveling carriage 22 side is continued, the elevating base 55 pushes up the elevating table 77 at the lower limit position of the engine carrying-in carriage 3 that is stopped at the fixed stop position on the conveyance carriage 1 while ascending and moving the conveyance carriage 1 and the engine carrying-in carriage 3 in a penetrating manner, while sandwiching the lid plate 72 in a space formed in between with the lower side surface (surface to be pushed up) of the pushed-up base portion 79. In other words, to the position where the pushed-up base portion 79 of the elevating table 77 can be thus pushed up by the elevating base 55, the fixed stop position of the engine carrying-in carriage 3 on the carriage floor surface 1a of the conveyance carriage 1 is set. In a state that the elevating base 55 of the lifter 31 on the synchronous traveling carriage 22 side pushes up the elevating table 77, the overall weight on the elevating table 77 side including the loaded engine E acts on the elevating base 55. Thus, the elevating base 55 descends from the elevating platform 54 against the urging force of the compression coil springs 64a and 64b, and finally, the elevating base 55 enters a state of being supported by the elevating platform 54, as shown in FIG. 13B. This state is detected by the elevating-base descent detecting sensor 69 via the detected plate 68 on the elevating base 55 side. Thus, when the elevating-base descent detection signal is transmitted from the elevating-base descent detecting sensor 69 within a fixed time, regarding this as normal, the actuation of the lifter 31 (ascent of the elevating base 55) is continued. On the other hand, when the elevating-base descent detection signal is not transmitted from the elevating-base descent detecting sensor 69 within a fixed time, regarding this as abnormal, the actuation of the lifter 31 can be cancelled, the warning can be issued, and also, the elevating base 55 can be descended.

As shown in FIG. 9B, when the elevating base 55 of the lifter 31 on the synchronous traveling carriage 22 side is ascended up to the upper limit position, and the elevating table 77 on the engine carrying-in carriage 3 side that has been pushed up by the elevating base 55 reaches the upper limit position, the table ceiling plate 78 on the elevating table 77 or the engine E that is mounted thereon and is supported by the engine support base is fitted into a predetermined position within the vehicle body B supported by the conveyance carriage 1 via the vehicle-body support means 12. When this is done, the assembly work of the engine E onto the vehicle body B can be performed by manual labor of a worker boarded on the carriage floor surface 1a of the conveyance carriage 1 or an automatic machine. Upon completion of the assembly work of the engine E, the elevating base 55 of the lifter 31 on the synchronous traveling carriage 22 side can be descended to the original lower-limit waiting position, as shown in FIG. 9C. That is, the pinion gear 57 in the elevating drive means 56 of the lifter 31 is reversely rotation-driven by the motor with a reducer 58 and the vertical elevating shaft rod 52 is descended, thereby the elevating base 55 and the elevating platform 54 are descended. As a result, the elevating table 77 on the engine carrying-in carriage 3 side (that has been pushed up by the elevating base 55), together with the engine support base (table ceiling plate 78 on the elevating table 77 or the dedicated engine support base mounted thereon) is descended by the gravity in a manner to follow the elevating base 55. The elevating table 77 is returned back to the lower limit position on the engine carrying-in carriage 3. Thereafter, the elevating base 55 and the lid plate 72 supported thereon are separated downwardly from the pushed-up base portion 79 of the elevating table 77 and continue descending. When the elevating base 55 passes downwardly of the aperture 71 of the carriage floor surface 1a of the conveyance carriage 1, the lid plate 72 blocks the aperture 71 as a result of the periphery of the lid plate 72 being returned back to the original position supported by the periphery of the aperture 71. The elevating base 55 that is downwardly separated from the lid plate 72 of the conveyance carriage 1 and descends is returned back to the original lower limit position on the synchronous traveling carriage 22. As a result, a series of actions are ended.

A series of above-described action steps, i.e., an ascending step of lifting up the engine E on the engine carrying-in carriage 3 by the elevating base 55 of the lifter 31 on the synchronous traveling carriage 22 side, a work step of assembling the engine E onto the vehicle body B on the conveyance carriage 1, and a descending step of the elevating base 55 after the engine assembly work are performed during a time that the conveyance carriage 1 travels accompanying the synchronous traveling carriage 22 from the start point position 6a to the end point position 6b in the engine-assembly-work section 6 shown in FIGS. 1 and 2. Then, after a series of these action steps are ended, the conveyance carriage 1 reaches the end point position 6b in the engine-assembly-work section 6. At this time, as shown by a solid line in FIG. 14, the pair of front and rear gripping pieces 34a and 34b of the joining means 29 on the synchronous traveling carriage 22 side are opened and lodged by the cylinder units 35a and 35b, thereby cancelled is the joining between the conveyance carriage 1 and the synchronous traveling carriage 22. As a result, the synchronous travel of the synchronous traveling carriage 22 with the conveyance carriage 1 is ended, and the synchronous traveling carriage 22 is stopped. On the other hand, the engine carrying-in carriage 3 that has become empty, i.e., the engine carrying-in carriage 3 in a state that the engine support base (the table ceiling plate 78 on the elevating table 77 or the dedicated engine support base mounted thereon) is supported on the elevating table 77 at the lower limit position, is caused to start the automatic travel and is exited onto the return-route floor surface 5b on the lateral side of the traveling route 2 from on the carriage floor surface 1a of the conveyance carriage 1.

In the illustration in FIGS. 1 and 2, the traveling route length from the start point position 6a to the end point position 6b in the engine-assembly-work section 6 and the entire length of the conveyance carriage 1 are the same. However, in fact, the traveling speed of the conveyance carriage 1 is extremely slow, and thus, the distance over which the conveyance carriage 1 travels during the series of action steps, i.e., the traveling route length from the start point position 6a to the end point position 6b in the engine-assembly-work section 6 is shorter than the entire length of the conveyance carriage 1. Thus, when the series of action steps are ended and the conveyance carriage 1 reaches the end point position 6b in the engine-assembly-work section 6, the immediately succeeding conveyance carriage 1 has not yet reached the start point position 6a in the engine-assembly-work section 6. Therefore, by causing the synchronous traveling carriage 22 that is cut off from the conveyance carriage 1 at the end point position 6b in the engine-assembly-work section 6 to reverse and travel at a high speed by the reversing drive means 30, the synchronous traveling carriage 22 can be returned to the start point position 6a in the engine-assembly-work section 6 before the immediately succeeding conveyance carriage 1 reaches the start point position 6a in the engine-assembly-work section 6. The reverse traveling of the synchronous traveling carriage 22 is executed as follows: the up-down swinging plate 49 is downwardly urged by the cylinder unit 50 of the reversing driving means 30, the drive wheel 45 rotation-driven by the motor with a reducer 47 is pressure-contacted against the passive wheel 44 on the axle 43 side, and thereby, the wheels 26 at both ends of the axle 43 is rotation-driven in the reversing direction.

Before the synchronous traveling carriage 22 reaches the start point position 6a in the engine-assembly-work section 6 or immediately after the synchronous traveling carriage 22 reaches the start point position 6a, only the front-side gripping piece 34a, out of the pair of front and rear gripping pieces 34a and 34b in an opened, lodged state before and after the joining means 29, is pushed upwardly and backwardly by the cylinder unit 35a, as described above. Thereby, the joining means 29 of the synchronous traveling carriage 22 is switched to an erected posture as indicated by a virtual line in FIG. 14. Then, when the synchronous traveling carriage 22 reaches the start point position 6a in the engine-assembly-work section 6, the rotation-driving of the drive wheel 45 by the motor with a reducer 47 of the reversing drive means 30 is ended. In addition, the up-down swinging plate 49 is pulled up by the cylinder unit 50, thereby, the drive wheel 45 is separated from the passive wheel 44 on the axle 43 side, and as a result, the synchronous traveling carriage 22 is switched to a free state, thereby preparing for a start of the synchronous traveling with the conveyance carriage 1 that reaches the start point position 6a in the engine-assembly-work section 6.

When the above-described action steps are repeated, the assembly work of the engine E carried in on each conveyance carriage 1 by the engine carrying-in carriage 3 can be sequentially performed on the vehicle body B supported by the vehicle-body support means 12 on each conveyance carriage 1 that travels on the traveling route 2 in a continuously linked manner. When various working carriages, such as the engine carrying-in carriage 3 shown in the embodiment or a hand truck, are utilized for carrying in the engine E onto the conveyance carriage 1, there is a need for safely pushing up the engine support base supported at the fixed position on the working carriage by the elevating base 55 of the lifter 31 on the synchronous traveling carriage 22 side that ascends and penetrates the conveyance carriage 1 and the working carriage. For this reason, the working carriage needs to be precisely stopped at the fixed stop position on the carriage floor surface 1a of the conveyance carriage 1 on the condition that the position of the engine (support base of the engine) for the working carriage is finalized. Therefore, carriage positioning means for positioning the working carriage at the fixed position on the carriage floor surface 1a of the conveyance carriage 1 can be disposed.

Figure 17:
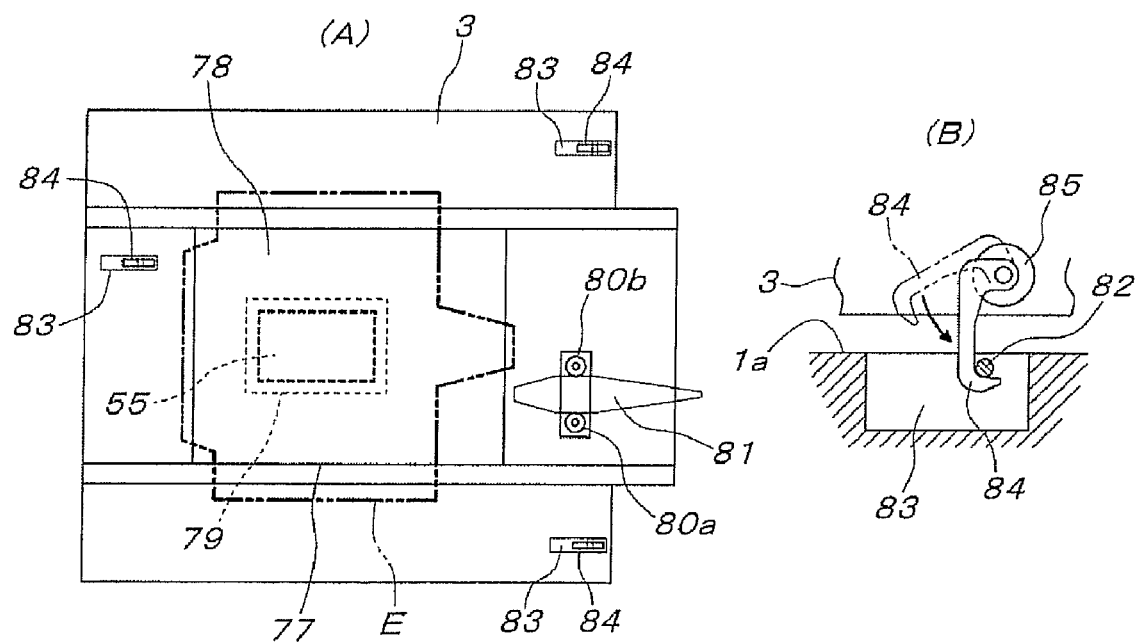
FIG. 17A is a schematic plan view for describing positioning means of the engine carrying-in carriage.
FIG. 17B is a vertical sectional side view showing a part of the positioning means.

Various types of carriage positioning means may be possible. For example, in the case where the working carriage is an engine carrying-in carriage 3 structured as shown in the embodiment, the carriage positioning means may be configured as shown in FIGS. 3, 4, and 17 such that a pair of left and right vertical axis rollers 80a and 80b are pivotally supported on the bottom of the engine carrying-in carriage 3; on the carriage floor surface 1a of the conveyance carriage 1, there is arranged a guide rail 81 formed in a ship shape in plane, for positioning a lateral (left and right) direction of the engine carrying-in carriage 3 by relatively intruding between the pair of left and right vertical axis rollers 80a and 80b; or on the carriage floor surface 1a of the conveyance carriage 1, concave groove portions 83 which are in a slit shape long in the traveling direction of the engine carrying-in carriage 3 and of which the inside is installed with an engaged bar 82 in a hanging manner in the lateral (left and right) direction are disposed to correspond to one location near the front end of the engine carrying-in carriage 3 that stops at the fixed position and two (left and right) locations near the rear end thereof, for example; and at a position directly above each concave groove portion 83 of the engine carrying-in carriage 3 that stops at the fixed position, there are arranged engaging hooks 84 of which the distal clamp is fitted within the concave groove portion 83 by being swung backwardly and downwardly so as to be interlocked with the internal engaged bar 82 and an actuator 85 for driving each engaging hook 84.

When the carriage positioning means is used, it is possible to prevent the engine carrying-in carriage 3 from floating up by the interlocking between the engaging hooks 83 at three locations on the engine carrying-in carriage 3 side and the engaged bar 82 on the carriage floor surface 1a side of the conveyance carriage 1. Thus, in the case where the engine carrying-in carriage 3 is light-structured and the elevating resistance of the elevating table 77 by the pantograph mechanism 76 is relatively large, when the elevating table 77 on the engine carrying-in carriage 3 is pushed up by the lifter 31 on the synchronous traveling carriage 22 side, the engine carrying-in carriage 3 itself can be prevented from being floated up or being vibrated upwardly and downwardly. When the stop position precision in the traveling direction of the engine carrying-in carriage 3 is not sufficient, the following carriage positioning means may be used in combination, for example: that which is composed of: a downwardly tapered off hole arranged on the carriage floor surface 1a side of the conveyance carriage 1; and an upwardly tapered off elevating rod that is descended from the engine carrying-in carriage 3 side so as to be fitted into the downwardly tapered off hole.

It is noted that in the embodiment, in the engine-assembly-work section 6 in which the engine E is assembled for the vehicle body B of an automobile, the conveyance apparatus for assembling an automobile, etc., of the present invention is used. However, the object conveyed and supported at a predetermined height on the conveyance carriage 1 is not limited to the vehicle body B of an automobile. Also, the assembly part that is assembled from below the object is not limited to the engine E.

What is claimed is:
1. A conveyance apparatus for an assembly line, comprising:
   support means being arranged, for supporting an object on a conveyance carriage for conveying the object such as an automobile at a predetermined height above the conveyance carriage;
   the support means being configured by a column installed upright on the conveyance carriage outside the object and object support devices attached to the column;
   the conveyance apparatus being configured such that a part assembly work can be performed from below an object on the conveyance carriage, the conveyance apparatus, wherein
   below a specific section where the part assembly work is performed within a traveling route of the conveyance carriage, a synchronous traveling carriage capable of traveling in synchronization with the conveyance car- riage from a start point position to an end point position in the specific section is arranged, on the synchronous traveling carriage, a lifter provided with an elevating base that is elevated via an aperture arranged on a floor surface of the conveyance carriage is loaded, an assembly-part support base carried in on the carriage floor surface is lifted up to a predetermined height by the elevating base of the lifter;

the synchronous traveling carriage being supported on the floor surface in a manner capable of traveling back and forth parallel with the traveling route of the conveyance carriage, is provided with joining means that can be joined to and detached from a joined portion arranged on the conveyance carriage, and is arranged with reversing drive means for causing the synchronous traveling carriage of which the joining to the conveyance carriage is cancelled at the end point position in the specific section to travel back to the start point position in the specific section;

the joined portion being composed of a columnar protrusion protrudingly provided downwardly at a bottom of the conveyance carriage, the joining means being configured by a pair of front and rear openable, closable gripping pieces for gripping the columnar protrusion from both front and rear sides in a traveling direction of the conveyance carriage, and a pair of actuators for separately driving to open and close the gripping pieces, and in the front-side gripping piece, detecting means for detecting approaching of the columnar protrusion is appended.

2. The conveyance apparatus for an assembly line, according to claim 1, wherein the reversing drive means comprises: a passive wheel arranged in an axle attached with a pair of left and right wheels of the synchronous traveling carriage; a drive wheel for pressure-contacting the passive wheel; switching means for switching between the drive wheel pressure-contacting the passive wheel and the drive wheel being separated from the passive wheel; and a motor for rotation-driving the drive wheel.

3. A conveyance apparatus for an assembly line, comprising:

support means being arranged, for supporting an object on a conveyance carriage for conveying the object such as an automobile at a predetermined height above the conveyance carriage;

the support means being configured by a column installed upright on the conveyance carriage outside the object and object support devices attached to the column;

the conveyance apparatus being configured such that a part assembly work can be performed from below an object on the conveyance carriage, the conveyance apparatus, wherein below a specific section where the part assembly work is performed within a traveling route of the conveyance carriage, a synchronous traveling carriage capable of traveling in synchronization with the conveyance carriage from a start point position to an end point position in the specific section is arranged, on the synchronous traveling carriage, a lifter provided with an elevating base that is elevated via an aperture arranged on a floor surface of the conveyance carriage is loaded, an assembly-part support base carried in on the carriage floor surface is lifted up to a predetermined height by the elevating base of the lifter; and the aperture arranged on the floor surface of the conveyance carriage being annexed with an openable, closable lid plate that is a part of the floor surface of the conveyance carriage when the aperture is closed, and the aperture being configured to open as a result of the lid plate being lifted up by ascent of the elevating base of the lifter.

4. The conveyance apparatus for an assembly line, according to claim 3, wherein the lid plate is liftable vertically from the floor surface of the conveyance carriage and an interlocked portion is arranged on a bottom of the lid plate, in the elevating base of the lifter, an interlocking portion for positioning the lid plate on the elevating base by being interlocked with the interlocked portion of the lid plate is arranged, and the assembly-part support base carried in on the carriage floor surface is lifted up by the elevating base of the lifter via the lid plate.

5. The conveyance apparatus for an assembly line, according to claim 4, wherein the elevating base of the lifter is supported elevatably within a fixed range relative to an elevating platform at an upper end of the lifter and also urged and maintained at an ascent point position by a first spring, in the elevating platform, a lid-plate-detecting elevating rod that is supported elevatably between a protruding position and an exiting, entering position relative to the elevating base at the ascent point position and that is urged and maintained at the protruding position by a second spring is arranged, the first spring and the second spring are set so that when the elevating base at the ascent point position lifts up the lid plate only, the lid-plate-detecting elevating rod only is descended while the elevating base is not descended, and sensors for separately detecting a descent of the elevating base for the elevating platform and a descent of the lid-plate-detecting elevating rod for the elevating base at the ascent point position are annexed.

6. A conveyance apparatus for an assembly line, comprising:

support means being arranged, for supporting an object on a conveyance carriage for conveying the object such as an automobile at a predetermined height above the conveyance carriage;

the support means being configured by a column installed upright on the conveyance carriage outside the object and object support devices attached to the column;

the conveyance apparatus being configured such that a part assembly work can be performed from below an object on the conveyance carriage, the conveyance apparatus, wherein below a specific section where the part assembly work is performed within a traveling route of the conveyance carriage, a synchronous traveling carriage capable of traveling in synchronization with the conveyance carriage from a start point position to an end point position in the specific section is arranged, on the synchronous traveling carriage, a lifter provided with an elevating base that is elevated via an aperture arranged on a floor surface of the conveyance carriage is loaded, an assembly-part support base carried in on the carriage floor surface is lifted up to a predetermined height by the elevating base of the lifter; and the assembly-part support base is supported on an assembly-part carrying-in carriage capable of transferring onto the floor surface of the conveyance carriage from outside the traveling route of the conveyance carriage and exiting to outside the traveling route of the conveyance carriage from on the floor surface of the conveyance carriage, and the elevating base of the lifter is configured to lift up the assembly-part support base by ascending in a penetrating manner the assembly-part carrying-in carriage that stops at a fixed position on the floor surface of the conveyance carriage.

7. The conveyance apparatus for an assembly line, according to claim 6, wherein the assembly-part support base is elevatably attached on the assembly-part carrying-in carriage.

8. The conveyance apparatus for an assembly line, according to claim 6, wherein on the floor surface of the conveyance carriage, positioning means for positioning the assembly-part carrying-in carriage at a fixed position is disposed.

* * * * *